(12) United States Patent
Hancock et al.

(10) Patent No.: US 12,319,270 B2
(45) Date of Patent: Jun. 3, 2025

(54) APPARATUS AND METHOD FOR CONTROLLING AN ELECTRIC MACHINE OF A VEHICLE

(71) Applicant: JAGUAR LAND ROVER LIMITED, Coventry (GB)

(72) Inventors: Matthew Hancock, Rugby (GB); Gareth Jones, Warwick (GB); Christina O'Sullivan, Warwick (GB); Ratheev Kumari Nair, Banbury (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 233 days.

(21) Appl. No.: 17/920,757

(22) PCT Filed: Apr. 21, 2021

(86) PCT No.: PCT/EP2021/060402
§ 371 (c)(1),
(2) Date: Oct. 21, 2022

(87) PCT Pub. No.: WO2021/214142
PCT Pub. Date: Oct. 28, 2021

(65) Prior Publication Data
US 2023/0166719 A1   Jun. 1, 2023

(30) Foreign Application Priority Data
Apr. 21, 2020  (GB) ...................... 2005810

(51) Int. Cl.
*B60W 20/40* (2016.01)
*B60W 10/02* (2006.01)
*B60W 10/08* (2006.01)
(52) U.S. Cl.
CPC ............ *B60W 20/40* (2013.01); *B60W 10/02* (2013.01); *B60W 10/08* (2013.01);
(Continued)

(58) Field of Classification Search
CPC ...... B60W 20/40; B60W 10/02; B60W 10/08; B60W 2510/081; B60W 2510/087;
(Continued)

(56) References Cited

U.S. PATENT DOCUMENTS 6,059,059 A * 5/2000 Schmidt-Brucken ....................... B60W 10/02
903/905
2004/0147366 A1   7/2004 Aoki et al.
(Continued)

FOREIGN PATENT DOCUMENTS

| JP | 2003326997 A | 11/2003 |
| JP | 2004208445 A | 7/2004 |
| WO | 2016156698 A1 | 10/2016 |

OTHER PUBLICATIONS

Japanese Office Action, with English translation, corresponding to application 2022-564069, dated Aug. 7, 2023, 8 pages.
(Continued)

*Primary Examiner* — Lan Jen
*Assistant Examiner* — Renee LaRose
(74) *Attorney, Agent, or Firm* — TROUTMAN PEPPER LOCKE LLP; Dustin B. Weeks; Nicholas Doss

(57) ABSTRACT

Embodiments of the present invention provide An electric machine control system for a vehicle, the electric machine control system comprising one or more controllers, wherein the vehicle comprises an electric machine arranged to be selectively coupleable to provide torque to at least one wheel of an axle of the vehicle, the control system comprising input means to receive a speed signal indicative of a speed of the vehicle, processing means arranged to determine a coupling state of the electric machine to the at least one wheel of the axle in dependence on the speed signal, and output means arranged to output a coupling signal indicative (Continued)

of the coupling state to control coupling of the electric machine to the at least one wheel of the axle.

12 Claims, 9 Drawing Sheets

(52) U.S. Cl.
CPC . *B60W 2510/081* (2013.01); *B60W 2510/087* (2013.01); *B60W 2510/244* (2013.01); *B60W 2520/10* (2013.01); *B60W 2710/021* (2013.01)

(58) Field of Classification Search
CPC ....... B60W 2510/244; B60W 2520/10; B60W 2710/021; Y02T 10/62; Y02T 10/64; Y02T 10/70; Y02T 10/72; B60K 6/485; B60K 6/52; B60L 2240/12; B60L 2240/423; B60L 2240/50; B60L 2260/26; B60L 2260/42; B60L 15/2054; B60L 58/14; B60L 50/61
See application file for complete search history.

(56) References Cited

U.S. PATENT DOCUMENTS

| | | | |
|---|---|---|---|
| 2015/0203106 | A1* | 7/2015 | Zhao .................. B60L 15/2009 701/22 |
| 2016/0272187 | A1* | 9/2016 | Yukawa .................. B60K 6/26 |
| 2019/0184808 | A1 | 6/2019 | Iwamitsu et al. |
| 2019/0322179 | A1 | 10/2019 | Holzl et al. |

OTHER PUBLICATIONS

Combined Search and Examination report corresponding to Great Britain Application No. GB2005810.3, Sep. 11, 2020, 5 pages.
International Search Report corresponding to International Application No. PCT/EP2021/060402, dated Jun. 23, 2021, 5 pages.
Written Opinion corresponding to International Application No. PCT/EP2021/060402, dated Jun. 23, 2021, 7 pages.

* cited by examiner

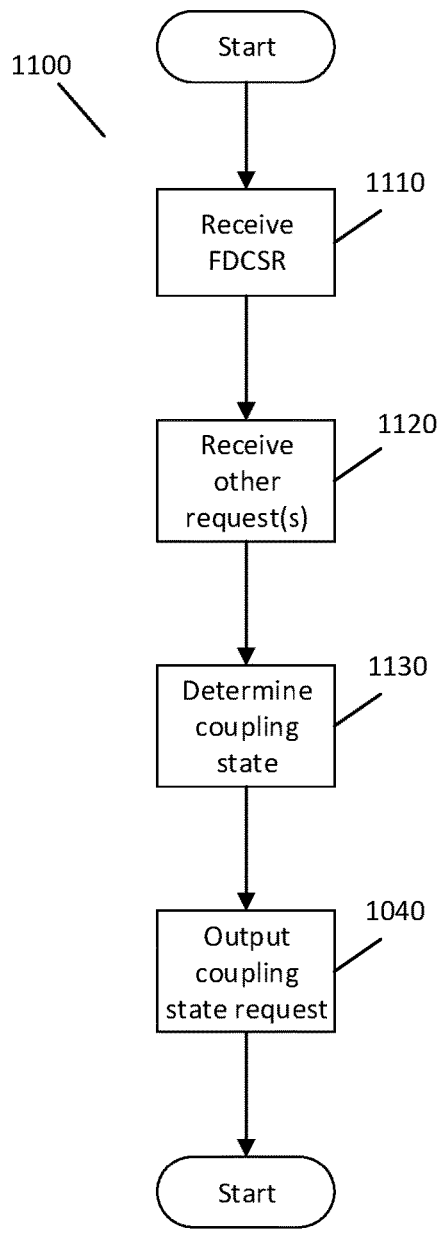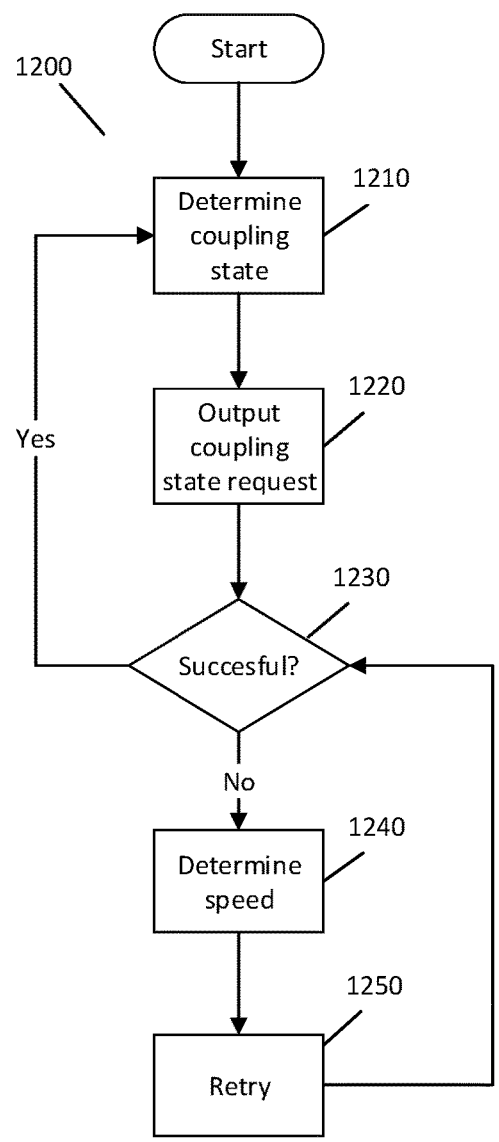
Fig. 10
Fig. 11

APPARATUS AND METHOD FOR CONTROLLING AN ELECTRIC MACHINE OF A VEHICLE

TECHNICAL FIELD

The present disclosure relates to controlling an electric machine and particularly, but not exclusively, to controlling coupling of an electric machine. Aspects of the invention relate to a control system, to a powertrain, to a vehicle, to a method and to computer software.

BACKGROUND

It is increasingly known for vehicles to be powered by more than one motive or traction power source, such as an internal combustion engine and one or more electric machines or motors. However, management of multiple traction power sources may be problematic. It is an object of embodiments of the invention to at least mitigate one or more of the problems of the prior art.

SUMMARY OF THE INVENTION

Aspects and embodiments of the invention provide a control system, a powertrain, a vehicle, a method and computer software as claimed in the appended claims.

According to an aspect of the invention, there is provided an electric machine control system for a vehicle, the electric machine control system comprising one or more controllers, wherein the vehicle comprises an electric machine arranged to be selectively coupleable to provide torque to at least one wheel of an axle of the vehicle processing means arranged to determine a coupling state of the electric machine to the at least one wheel of the axle. Advantageously the processing means is arranged to determine the coupling of the electric machine to the at least one wheel of the axle.

According to another aspect of the invention, there is provided an electric machine control system for a vehicle, the electric machine control system comprising one or more controllers, wherein the vehicle comprises an electric machine arranged to be selectively coupleable to provide torque to at least one wheel of an axle of the vehicle, the control system comprising input means to receive a speed signal indicative of a speed of the vehicle, processing means arranged to determine a coupling state of the electric machine to the at least one wheel of the axle in dependence on the speed signal, and output means arranged to output a coupling signal indicative of the coupling state to control coupling of the electric machine to the at least one wheel of the axle. Advantageously the processing means is arranged to determine the coupling of the electric machine to the at least one wheel of the axle in dependence on the speed of the vehicle.

The processing means is optionally arranged to determine the desired coupling state as decoupled in dependence on the speed signal being indicative of a vehicle speed equal to or greater than a first high-speed threshold. Advantageously the decoupled state prevents excessive rotation speed of the electric machine.

The processing means may determine the desired coupling state as no-request in dependence on the speed signal being indicative of vehicle speed equal to or below a second high-speed threshold. Advantageously the processing means does not request a coupling state at lower rotation speeds of the electric machine. Advantageously two thresholds are used thereby improving control of the coupling. The second high-speed threshold may represent a vehicle speed lower than the first high-speed threshold. Advantageously the no-request is determined at a lower speed than the decoupled state.

The output means is optionally arranged to output the coupling signal indicative of a request to decouple the electric machine from the at least one wheel of the axle in dependence on the desired coupling state being decoupled. Advantageously the output means indicates the desired decoupling in dependence on the decoupled state being determined.

Optionally the processing means is arranged to determine the desired coupling state in dependence on the speed signal being indicative of a vehicle speed between the first and second high-speed thresholds in dependence on a last intersected of the first and second high-speed thresholds. Advantageously excessive or frequent switching of coupling states is prevented.

The input means may be arranged to receive a temperature signal, and the processing means is arranged to determine the coupling state in dependence on the temperature signal. Advantageously temperature is considered in determining the coupling state.

The processing means may be arranged to determine one or both of the first and second high-speed thresholds in dependence on the temperature signal. Advantageously one or both of the thresholds may be responsive to the temperature.

The processing means is optionally arranged to reduce one or both of the first and second high-speed thresholds in dependence on the temperature signal being indicative of at least a first predetermined temperature. Advantageously, the decoupling may be determined at lower speeds in a presence of higher temperatures. The first predetermined temperature may be at least 35° C. Advantageously when the temperature is at least 35.0 one or both of the thresholds may be reduced.

Optionally the processing means is arranged to reduce one or both of the first and second high-speed thresholds in dependence on the temperature signal being indicative of less than or equal to a second predetermined temperature. Advantageously, the decoupling may be determined at lower speeds in a presence of lower temperatures.

Optionally the processing means is arranged to reduce one or both of the first and second high-speed thresholds proportional to temperature. Advantageously, the decoupling may be determined at lower speeds proportional to temperature. Optionally one or both of the first and second high-speed thresholds are reduced proportional to temperature in a range between −10° C. and −20° C. Advantageously, in the range between −10° C. and −20° C. the decoupling may be determined proportional to temperature.

The second predetermined temperature may be less than or equal to −5° C. Advantageously, the decoupling may be determined at lower speeds in a presence a temperature below −5° C. Optionally the decoupling may be determined at lower speeds in a presence a temperature below −10° C.

The input means may be arranged to receive a charge signal indicative of a state of charge (SoC) of one or more batteries for providing electrical power to the electric machine. The one or more batteries may be traction batteries. The processing means is optionally arranged to determine the coupling state in dependence on the charge signal. Advantageously, the state of charge of the one or more batteries may be considered in determining the coupling.

The processing means may be arranged to determine the second high-speed threshold in dependence on the charge signal. Advantageously, the determination of the no-request state may be made in dependence on the state of charge.

The controller of claim 10 when dependent through claim 2, wherein the processing means is arranged to determine the desired coupling state of the electric machine as decoupled in dependence on the charge signal being indicative of a state of charge of the one or more batteries being less than a predetermined threshold and the speed signal being indicative of vehicle speed below the second threshold.

The input means may be arranged to receive one or more further signals indicative of a state of one or more further vehicle subsystems or one or more further attributes of the vehicle. The processing means may be arranged to determine the desired coupling state of the electric machine at least in part on dependence on the one or more further signals. Advantageously, the state of the one or more further vehicle subsystems or one or more further attributes may be considered in the determination of the coupling state.

The processing means is optionally arranged to determine the desired coupling state of the electric machine in precedence on the speed signal over the one or more further signals. Advantageously, the speed signal is given a higher priority.

The first high-speed threshold may represent a vehicle speed which is less than a desired decoupling vehicle speed, such that when the vehicle is accelerating the electric machine is decoupled from the at least one wheel of the axle when the vehicle reaches the desired decoupling vehicle speed. Advantageously, a delay in implementing the decoupling may be accounted for to prevent excessive rotation speed of the electric machine.

According to a still further aspect of the invention, there is provided a powertrain comprising the system as described above.

According to yet another aspect of the invention, there is provided a vehicle comprising the control system or the powertrain as described above.

The electric machine may be arranged to be selectively coupleable to provide torque to at least one wheel of a first axle of the vehicle, and the vehicle optionally comprises a second motive power source arranged to provide torque to at least one wheel of a second axle of the vehicle. Advantageously, the coupling of the electric machine is determined with torque optionally provided to the second axle by the second electric machine. The second motive power source may comprise a second electric machine. Advantageously, the vehicle may be an electric vehicle.

According to another aspect of the invention, there is provided a method of controlling coupling of an electric machine to provide torque to at least one wheel of an axle of a vehicle, the method comprising receiving a speed signal indicative of a speed of the vehicle, determining a coupling state of the electric machine to the at least one wheel of the axle in dependence on the speed signal, and outputting a coupling signal indicative of the coupling state to control coupling of the electric machine to the at least one wheel of the axle.

The determining of the coupling state may comprise determining a desired coupling state of the electric machine to the at least one wheel of the axle in dependence on the speed signal. The desired coupling state may be determined as decoupled in dependence on the speed signal being indicative of a vehicle speed equal to or greater than a first high-speed threshold.

The desired coupling state may be determined as no-request in dependence on the speed signal being indicative of vehicle speed equal to or below a second high-speed threshold, wherein the second high-speed threshold represents a vehicle speed lower than the first high-speed threshold.

The method may comprise outputting the coupling signal indicative of a request to decouple the electric machine from the at least one wheel of the axle in dependence on the desired coupling state being decoupled.

The method may comprising determining the desired coupling state in dependence on the speed signal being indicative of a vehicle speed between the first and second high-speed thresholds in dependence on a last intersected of the first and second high-speed thresholds.

The method may comprising receiving a temperature signal. The coupling state is optionally determined in dependence on the temperature signal.

The method may comprise receiving a charge signal indicative of a state of charge of one or more batteries for providing electrical power to the electric machine and determining the coupling state in dependence on the charge signal.

The processing means m be arranged to determine the desired coupling state as coupled in dependence on a speed signal being indicative of a vehicle speed equal to or below a first low-speed threshold. Advantageously the processing means is arranged to determine the coupling of the electric machine as coupled to the at least one wheel of the axle at lower speeds.

According to an aspect of the invention, there is provided an electric machine control system for a vehicle, the electric machine control system comprising one or more controllers, wherein the vehicle comprises an electric machine arranged to be selectively coupleable to provide torque to at least one wheel of an axle of the vehicle, the control system comprising input means to receive a speed signal indicative of a speed of the vehicle, processing means arranged to determine a desired coupling state of the electric machine to the at least one wheel of the axle in dependence on the speed signal, wherein the processing means is arranged to determine the desired coupling state as coupled in dependence on the speed signal being indicative of a vehicle speed equal to or below a first low-speed threshold and to determine the desired coupling state as no-request in dependence on the speed signal being indicative of a vehicle speed above a second low-speed threshold, wherein the second low-speed threshold represents a vehicle speed greater than the first low-speed threshold, and output means arranged to output a coupling signal indicative of a request to couple the electric machine to the at least one wheel of the axle in dependence on the desired coupling state being coupled. Advantageously the processing means does not request a coupling state at higher rotation speeds of the electric machine. Advantageously two thresholds are used thereby improving control of the coupling. Advantageously the no-request is determined at a higher speed than the decoupled state.

The processing means may be arranged to determine the desired coupling state in dependence on the speed signal being indicative of a vehicle speed between the first and second low-speed thresholds in dependence on a last-intersected threshold of the first and second low-speed thresholds. Advantageously excessive or frequent switching of coupling states is prevented.

The processing means is optionally arranged to determine the desired coupling state as coupled when the last-intersected threshold is the first low-speed threshold. Advantageously the coupled state is maintained when more recently selected.

The processing means is optionally arranged to determine the desired coupling state as no-request when the last-intersected threshold is the second low-speed threshold. Advantageously the no=request state is maintained when more recently selected.

The input means may be arranged to receive a signal indicative of a coupling status of the electric machine to the at least one wheel of the axle. Advantageously the actual coupling state is indicated to the processing means.

The processing means may be arranged to control the output means to output a coupling inhibit signal in dependence on the speed signal being indicative of a vehicle speed equal to or below a third low-speed threshold and the coupling status signal being indicative of the electric machine being decoupled from the at least one wheel of the axle. Advantageously, if the electric machine is decoupled at very low speed, the coupling is inhibited.

The processing means is optionally arranged to control the output means to cease output of the coupling inhibit signal in dependence on the speed signal being indicative of a vehicle speed equal to or above a fourth low-speed threshold. Advantageously the inhibition is removed when the vehicle speed increases.

The processing means may be arranged to determine, in dependence on the speed signal, a deacceleration rate of the vehicle and to determine the first low-speed threshold in dependence on the deacceleration rate of the vehicle. Advantageously, the first low-speed threshold is adaptive to the deacceleration rate.

The processing means may be arranged to increase the first low-speed threshold in dependence on the deacceleration rate being equal to or greater than a predetermined deacceleration rate. Advantageously, greater time is provided to achieve coupling when the vehicle is deaccelerating more quickly.

According to an aspect of the invention, there is provided a powertrain comprising the system as described above.

According to an aspect of the invention, there is provided a vehicle comprising the control system or the powertrain as described above.

According to an aspect of the invention, there is provided a method of controlling coupling of an electric machine to provide torque to at least one wheel of an axle of a vehicle, the method comprising receiving a speed signal indicative of a speed of the vehicle, determining a desired coupling state of the electric machine to the at least one wheel of the axle in dependence on the speed signal, wherein the desired coupling state is determined as coupled in dependence on the speed signal being indicative of a vehicle speed equal to or below a first low-speed threshold, and no-request in dependence on the speed signal being indicative of a vehicle speed above a second low-speed threshold, wherein the second low-speed threshold represents a vehicle speed greater than the first low-speed threshold.

The method comprise outputting a coupling signal indicative of a request to couple the electric machine to the at least one wheel of the axle in dependence on the desired coupling state being coupled.

The desired coupling state is optionally determined in dependence on the speed signal being indicative of a vehicle speed between the first and second low-speed thresholds in dependence on a last-intersected threshold of the first and second low-speed thresholds.

The method may comprise determining the desired coupling state as coupled when the last-intersected threshold is the first low-speed threshold. The method may comprise determining the desired coupling state as no-request when the last-intersected threshold is the second low-speed threshold.

The method optionally comprises receiving a signal indicative of a coupling status of the electric machine to the at least one wheel of the axle.

The method optionally comprises outputting a coupling inhibit signal in dependence on the speed signal being indicative of a vehicle speed equal to or below a third low-speed threshold. The coupling status signal may be indicative of the electric machine being decoupled from the at least one wheel of the axle.

The method may comprise ceasing output of the coupling inhibit signal in dependence on the speed signal being indicative of a vehicle speed equal to or above a fourth low-speed threshold.

Optionally the method comprises determining, in dependence on the speed signal, a deacceleration rate of the vehicle. The method may comprise determining the first low-speed threshold in dependence on the deacceleration rate of the vehicle.

The processing means may be arranged to increase the first low-speed threshold in dependence on the deacceleration rate being equal to or greater than a predetermined deacceleration rate.

According to an aspect of the invention, there is provided an electric machine control system for a vehicle, the electric machine control system comprising one or more controllers, wherein the vehicle comprises an electric machine arranged to be selectively coupleable to provide torque to at least one wheel of an axle of the vehicle, the control system comprising input means to receive a speed signal indicative of a speed of the vehicle, processing means arranged to determine a desired coupling state of the electric machine to the at least one wheel of the axle in dependence on the speed signal, wherein the processing means is arranged to determine the desired coupling state as coupled in dependence on the speed signal being indicative of a vehicle speed equal to or below a first low-speed threshold and to determine the desired coupling state as no-request in dependence on the speed signal being indicative of a vehicle speed above a second low-speed threshold, wherein the second low-speed threshold represents a vehicle speed greater than the first low-speed threshold, and output means arranged to output a coupling signal indicative of a request to couple the electric machine to the at least one wheel of the axle in dependence on the desired coupling state being coupled. Advantageously the processing means does not request a coupling state at higher rotation speeds of the electric machine. Advantageously two thresholds are used thereby improving control of the coupling. Advantageously the no-request is determined at a higher speed than the decoupled state.

The processing means may be arranged to determine the desired coupling state in dependence on the speed signal being indicative of a vehicle speed between the first and second low-speed thresholds in dependence on a last-intersected threshold of the first and second low-speed thresholds. Advantageously excessive or frequent switching of coupling states is prevented.

The processing means is optionally arranged to determine the desired coupling state as coupled when the last-intersected threshold is the first low-speed threshold. Advantageously the coupled state is maintained when more recently selected.

The processing means is optionally arranged to determine the desired coupling state as no-request when the last-intersected threshold is the second low-speed threshold. Advantageously the no=request state is maintained when more recently selected.

The input means may be arranged to receive a signal indicative of a coupling status of the electric machine to the at least one wheel of the axle. Advantageously the actual coupling state is indicated to the processing means.

The processing means may be arranged to control the output means to output a coupling inhibit signal in dependence on the speed signal being indicative of a vehicle speed equal to or below a third low-speed threshold and the coupling status signal being indicative of the electric machine being decoupled from the at least one wheel of the axle. Advantageously, if the electric machine is decoupled at very low speed, the coupling is inhibited.

The processing means is optionally arranged to control the output means to cease output of the coupling inhibit signal in dependence on the speed signal being indicative of a vehicle speed equal to or above a fourth low-speed threshold. Advantageously the inhibition is removed when the vehicle speed increases.

The processing means may be arranged to determine, in dependence on the speed signal, a deacceleration rate of the vehicle and to determine the first low-speed threshold in dependence on the deacceleration rate of the vehicle. Advantageously, the first low-speed threshold is adaptive to the deacceleration rate.

The processing means may be arranged to increase the first low-speed threshold in dependence on the deacceleration rate being equal to or greater than a predetermined deacceleration rate. Advantageously, greater time is provided to achieve coupling when the vehicle is deacceleration more quickly.

According to an aspect of the invention, there is provided a powertrain comprising the system as described above.

According to an aspect of the invention, there is provided a vehicle comprising the control system or the powertrain as described above.

According to an aspect of the invention, there is provided a method of controlling coupling of an electric machine to provide torque to at least one wheel of an axle of a vehicle, the method comprising receiving a speed signal indicative of a speed of the vehicle, determining a desired coupling state of the electric machine to the at least one wheel of the axle in dependence on the speed signal, wherein the desired coupling state is determined as coupled in dependence on the speed signal being indicative of a vehicle speed equal to or below a first low-speed threshold, and no-request in dependence on the speed signal being indicative of a vehicle speed above a second low-speed threshold, wherein the second low-speed threshold represents a vehicle speed greater than the first low-speed threshold.

The method comprise outputting a coupling signal indicative of a request to couple the electric machine to the at least one wheel of the axle in dependence on the desired coupling state being coupled.

The desired coupling state is optionally determined in dependence on the speed signal being indicative of a vehicle speed between the first and second low-speed thresholds in dependence on a last-intersected threshold of the first and second low-speed thresholds.

The method may comprise determining the desired coupling state as coupled when the last-intersected threshold is the first low-speed threshold. The method may comprise determining the desired coupling state as no-request when the last-intersected threshold is the second low-speed threshold.

The method optionally comprises receiving a signal indicative of a coupling status of the electric machine to the at least one wheel of the axle.

The method optionally comprises outputting a coupling inhibit signal in dependence on the speed signal being indicative of a vehicle speed equal to or below a third low-speed threshold. The coupling status signal may be indicative of the electric machine being decoupled from the at least one wheel of the axle.

The method may comprise ceasing output of the coupling inhibit signal in dependence on the speed signal being indicative of a vehicle speed equal to or above a fourth low-speed threshold.

Optionally the method comprises determining, in dependence on the speed signal, a deacceleration rate of the vehicle. The method may comprise determining the first low-speed threshold in dependence on the deacceleration rate of the vehicle.

The processing means may be arranged to increase the first low-speed threshold in dependence on the deacceleration rate being equal to or greater than a predetermined deacceleration rate.

According to another aspect of the invention, there is provided computer software which, when executed by a computer, is arranged to perform a method as described above. The computer software may be stored on a computer-readable medium. The computer software may be tangibly stored on the computer readable medium.

According to an aspect of the invention, there is provided an electric machine control system for a vehicle, the electric machine control system comprising one or more controllers, wherein the vehicle comprises an electric machine arranged to be selectively coupleable to provide torque to at least one wheel of an axle of the vehicle, the control system comprising: input means to receive a fault-derived coupling state request signal indicative of a request for a coupling state of the electric machine to the at least one wheel of the axle; processing means arranged to determine the coupling state of the electric machine to the at least one wheel of the axle in dependence on the fault-derived coupling state request signal, and output means arranged to output a coupling signal indicative of the determined coupling state to control coupling of the electric machine to the at least one wheel of the axle. Advantageously the coupling state is determined in dependence on the fault derived coupling state request.

According to an aspect of the invention, there is provided an electric machine control system for a vehicle, the electric machine control system comprising one or more controllers, wherein the vehicle comprises an electric machine arranged to be selectively coupleable to provide torque to at least one wheel of an axle of the vehicle, the control system comprising: input means to receive a fault-derived coupling state request signal and at least one further coupling state request signal, wherein each coupling state request signal is indicative of a request for a coupling state of the electric machine to the at least one wheel of the axle; processing means arranged to determine the coupling state of the electric machine to the at least one wheel of the axle in dependence on the fault-derived coupling state request signal and the at least one further coupling state request signal, wherein the processing means is arranged to determine the coupling state of the electric machine in precedence on the fault-derived coupling state request signal over the at least one further coupling state request signal; and output means arranged to output a coupling signal indicative of the determined coupling state to control coupling of the electric machine to the at least one wheel of the axle. Advantageously the coupling state is determined in dependence on the fault derived coupling state request.

The input means may be arranged to receive a high-speed coupling state request signal indicative of a request to disconnect the electric machine from the at least one wheel of the axle. The processing means may be arranged to determine the coupling state of the electric machine to the at least one wheel of the axle in dependence on the high-speed coupling state request signal in precedence over the fault-derived coupling state request signal. The output means may be arranged to output the coupling signal indicative of the determined coupling state. Advantageously precedence is given to the high-speed coupling state request.

The fault-derived coupling state request signal is optionally indicative of a request to couple the electric machine to the at least one wheel of the axle of the vehicle; the processing means is arranged to determine the coupling state as coupled in precedence over the at least one further coupling state request signal being indicative of a request to decouple the electric machine from the at least one wheel of the axle of the vehicle. The output means may be arranged to output the coupling signal indicative of the determined coupling state. Advantageously precedence is given to the coupling state to couple the electric machine.

The fault-derived coupling state request signal may be indicative of a request to decouple the electric machine from the at least one wheel of the axle of the vehicle; the processing means is arranged to determine the coupling state as decoupled in precedence over the at least one further coupling state request signal being indicative of a request to couple the at least one wheel of the axle of the vehicle; and the output means may be arranged to output the coupling signal indicative of the determined coupling state. Advantageously precedence is given to the coupling state to decouple the electric machine.

The input means may be arranged to receive a speed signal indicative of a speed of the vehicle; wherein, when the processing means determines a change in the coupling state from decoupled to coupled in dependence on the fault-derived coupling state request signal, the processing means may be arranged to defer controlling the output means to output the coupling state signal indicative of the change coupling state in dependence on the speed signal being indicative of at least a predetermined speed. Advantageously the change in coupling state is deferred in dependence on the speed of the vehicle.

The predetermined speed may be a speed greater than substantially 0 kmh$^{-1}$. Advantageously the change in coupling state is deferred until the vehicle is moving.

The least one further coupling state request signal may be determined in dependence on a speed signal indicative of a speed of the vehicle. Advantageously the further coupling state request signal is determined in dependence on the speed of the vehicle.

The least one further coupling state request signal may be determined in dependence on a driving mode signal indicative of a driving mode of the vehicle. Advantageously the further coupling state request signal is determined in dependence on the driving mode.

According to an aspect of the invention, there is provided a powertrain comprising the system of any as described above.

According to an aspect of the invention, there is provided a vehicle comprising the control system as described above or the powertrain as described above.

The electric machine may be arranged to be selectively coupleable to provide torque to at least one wheel of a first axle of the vehicle, and the vehicle comprises a second motive power source arranged to provide torque to at least one wheel of a second axle of the vehicle. The second motive power source may comprise a second electric machine.

According to an aspect of the invention, there is provided a method controlling coupling of an electric machine to provide torque to at least one wheel of an axle of a vehicle, the method comprising: receiving a fault-derived coupling state request, fault-derived coupling state request, signal and at least one further coupling state request signal, wherein each coupling state signal is indicative of a request for a coupling state of the electric machine to the at least one wheel of the axle; determine the coupling state of the electric machine to the at least one wheel of the axle in dependence on the fault-derived coupling state request signal and the at least one further coupling state request signal in precedence on the fault-derived coupling state request signal over the at least one further coupling state request signal; and outputting a coupling signal indicative of the determined coupling state to control coupling of the electric machine to the at least one wheel of the axle.

The method may comprise receiving a high-speed coupling state request signal indicative of a request to disconnect the electric machine from the at least one wheel of the axle; determining the coupling state of the electric machine to the at least one wheel of the axle in dependence on the high-speed coupling state request signal in precedence over the fault-derived coupling state request signal; and outputting the coupling signal indicative of the determined coupling state.

The fault-derived coupling state request signal may be indicative of a request to couple the electric machine to the at least one wheel of the axle of the vehicle. The method may comprise determining the coupling state as coupled in precedence over the at least one further coupling state request signal being indicative of a request to decouple the at least one wheel of the axle of the vehicle. The method may comprise outputting the coupling signal indicative of the determined coupling state.

The fault-derived coupling state request signal may be indicative of a request to decouple the electric machine from the at least one wheel of the axle of the vehicle. The method may comprise determining the coupling state as decoupled in precedence over the at least one further coupling state request signal being indicative of a request to couple the at least one wheel of the axle of the vehicle. The method may comprise outputting the coupling signal indicative of the determined coupling state.

The method may comprise receiving a speed signal indicative of a speed of the vehicle; determining a change in the coupling state from decoupled to coupled in dependence on the fault-derived coupling state request signal. The method may comprise deferring outputting the coupling state signal indicative of the change coupling state in dependence on the speed signal being indicative of at least a predetermined speed.

The predetermined speed may be a speed greater than substantially 0 kmh$^{-1}$.

The method may comprise determining the least one further coupling state request signal in dependence on a speed signal indicative of a speed of the vehicle.

The method may comprise determining the least one further coupling state request signal in dependence on a driving mode signal indicative of a driving mode of the vehicle.

According to another aspect of the invention, there is provided computer software which, when executed by a computer, is arranged to perform a method as described above. The computer software may be stored on a computer-readable medium. The computer software may be tangibly stored on the computer readable medium.

According to an aspect of the invention, there is provided an electric machine control system for a vehicle, the electric machine control system comprising one or more controllers, wherein the vehicle comprises an electric machine arranged to be selectively coupleable to provide torque to at least one wheel of an axle of the vehicle, the control system comprising: input means arranged to receive a status signal indicative of a status of a coupling of the electric machine to the at least one wheel of an axle of the vehicle; output means arranged to output a coupling signal to control coupling of the electric machine to the at least one wheel of the axle; and processing means arranged to determine a coupling state of the electric machine to the at least one wheel of the axle and to control the output means to output a coupling signal indicative of the determined coupling state, wherein the processing means is arranged to control the output means to output the coupling signal indicative of a retry of the change in the coupling state in dependence on the speed signal. Advantageously the change in coupling state is retried.

According to an aspect of the invention, there is provided an electric machine control system for a vehicle, the electric machine control system comprising one or more controllers, wherein the vehicle comprises an electric machine arranged to be selectively coupleable to provide torque to at least one wheel of an axle of the vehicle, the control system comprising: input means arranged to receive a speed signal indicative of a speed of the vehicle and a status signal indicative of a status of a coupling of the electric machine to the at least one wheel of an axle of the vehicle; output means arranged to output a coupling signal to control coupling of the electric machine to the at least one wheel of the axle; and processing means arranged to determine a coupling state of the electric machine to the at least one wheel of the axle and to control the output means to output a coupling signal indicative of the determined coupling state, wherein the processing means is arranged, in dependence on the status signal being indicative of a failure to change the coupling state of the electric machine to the at least one wheel of the axle in dependence on a change in the determined coupling state, to control the output means to output the coupling signal indicative of a retry of the change in the coupling state in dependence on the speed signal. Advantageously the change in coupling state is retried in dependence on the status signal.

The processing means may be arranged to defer controlling the output means to output the coupling signal indicative of the retry of the change in the coupling state in dependence on the speed signal being indicative of the speed of the vehicle being at least a predetermined minimum speed. Advantageously the change in coupling state is retried in dependence on the speed of the vehicle.

The predetermined speed is optionally a speed greater than substantially 0 $kmh^{-1}$. Advantageously the change in coupling state is retried when the vehicle is moving. In some embodiments, the change in coupling state is only retried when the vehicle is moving.

Optionally the processing means is arranged to defer controlling the output means to output the coupling signal indicative of the retry of the change in the coupling state in dependence on the speed signal being indicative of the speed of the vehicle being less than or equal to a predetermined maximum speed. Advantageously the change in coupling state is retried up to the predetermined maximum speed. The maximum speed may be less than 50 $kmh^{-1}$. The maximum speed may be less than 20 $kmh^{-1}$.

The processing means is optionally arranged to control the output means to output the coupling signal indicative of the retry of the change in the coupling state in dependence on the speed signal up to a predetermined maximum number of times. Advantageously the change in coupling state is retried up to the predetermined maximum number of times. The predetermined maximum number of times may be 5.

According to an aspect of the invention, there is provided a powertrain comprising the system as described above.

According to an aspect of the invention, there is provided a vehicle comprising the control system as described above or the powertrain as described above.

The electric machine may be arranged to be selectively coupleable to provide torque to at least one wheel of a first axle of the vehicle, and the vehicle comprises a second motive power source arranged to provide torque to at least one wheel of a second axle of the vehicle. The second motive power source may comprise a second electric machine.

According to an aspect of the invention, there is provided a method of controlling coupling of an electric machine to provide torque to at least one wheel of an axle of a vehicle, the method comprising: receiving a speed signal indicative of a speed of the vehicle and a status signal indicative of a status of a coupling of the electric machine to the at least one wheel of an axle of the vehicle; determining a coupling state of the electric machine to the at least one wheel of the axle; outputting a coupling signal indicative of the determined coupling state to control the coupling of the electric machine to the at least one wheel of the axle; determining, in dependence on the status signal, a failure to change the coupling state of the electric machine to the at least one wheel of the axle in dependence on a change in the determined coupling state; and outputting, in dependence on the determined failure, the coupling signal indicative of a retry of the change in the coupling state in dependence on the speed signal.

The method may comprise deferring the outputting of the coupling signal indicative of the retry of the change in the coupling state in dependence on the speed signal being indicative of the speed of the vehicle being at least a predetermined minimum speed.

The predetermined speed may be a speed greater than substantially 0 $kmh^{-1}$.

The method may comprise deferring outputting the coupling signal indicative of the retry of the change in the coupling state in dependence on the speed signal being indicative of the speed of the vehicle being less than or equal to a predetermined maximum speed.

The maximum speed may be less than 50 $kmh^{-1}$. The maximum speed may be less than 20 $kmh^{-1}$.

The method may comprise outputting the coupling signal indicative of the retry of the change in the coupling state in dependence on the speed signal up to a predetermined maximum number of times. The predetermined maximum number of times may be 5.

According to an aspect of the invention, there is provided an electric machine control system for a vehicle, the electric machine control system comprising one or more controllers, wherein the vehicle comprises an electric machine arranged to be selectively coupleable to provide torque to at least one wheel of an axle of the vehicle, the control system comprising: input means to receive at least one attribute signal indicative of one or more attributes of the vehicle; output means arranged to output a coupling signal to control coupling of the electric machine to the at least one wheel of the axle; and processing means arranged to determine a coupling state of the electric machine to the at least one wheel of the axle in dependence on the at least one attribute signal, wherein the processing means is arranged to control the output means to output the coupling signal indicative of the determined coupling state at lower than a predetermined frequency indicative of a change in coupling state. The predetermined frequency is determined in dependence on a predetermined period of time since a last change in the coupling state. Advantageously excessively frequent changes in coupling state are prevented.

According to an aspect of the invention, there is provided an electric machine control system for a vehicle, the electric machine control system comprising one or more controllers, wherein the vehicle comprises an electric machine arranged to be selectively coupleable to provide torque to at least one wheel of an axle of the vehicle, the control system comprising: input means to receive at least one attribute signal indicative of one or more attributes of the vehicle; output means arranged to output a coupling signal to control coupling of the electric machine to the at least one wheel of the axle; and processing means arranged to determine a coupling state of the electric machine to the at least one wheel of the axle in dependence on the at least one attribute signal, wherein the processing means is arranged to control the output means to output the coupling signal indicative of the determined coupling state, wherein the processing means is arranged to defer controlling the output means to output the coupling signal indicative of a change in the coupling state until expiry of a predetermined period of time since a last change in the coupling state indicated by the coupling signal. Advantageously excessively frequent changes in coupling state are prevented.

The predetermined period of time may be 30 seconds. Advantageously frequent changes in coupling state are prevented.

The predetermined period of time may be 10 seconds. The predetermined period of time may be 5 seconds. Advantageously regular changes in coupling state are prevented.

The change in the coupling state may be from coupled to decoupled. The change in the coupling state may be from decoupled to coupled. Advantageously the changes in coupling state from decoupled to coupled or coupled to decoupled are prevented.

The at least one attribute signal may comprise a speed signal indicative of a speed of the vehicle. Advantageously the coupling state may be determined in dependence on a speed of the vehicle.

The at least one attribute signal may comprise a driving mode signal indicative of a driving mode of the vehicle. Advantageously the coupling state may be determined in dependence on a driving mode of the vehicle.

According to an aspect of the invention, there is provided a powertrain comprising the system as described above.

According to an aspect of the invention, there is provided a vehicle comprising the control system as described above or the powertrain as described above.

The v electric machine may be arranged to be selectively coupleable to provide torque to at least one wheel of a first axle of the vehicle. The vehicle comprises a second motive power source arranged to provide torque to at least one wheel of a second axle of the vehicle. The second motive power source may comprise a second electric machine.

According to an aspect of the invention, there is provided a method of controlling coupling of an electric machine to provide torque to at least one wheel of an axle of a vehicle, the method comprising: receiving at least one attribute signal indicative of one or more attributes of the vehicle; determining a coupling state of the electric machine to the at least one wheel of the axle in dependence on the at least one attribute signal; and outputting a coupling signal indicative of the determined coupling state to control coupling of the electric machine to the at least one wheel of the axle, wherein the outputting comprises deferring outputting the coupling signal indicative of a change in the coupling state until expiry of a predetermined period of time since a last change in the coupling state indicated by the coupling signal.

The predetermined period of time may be 30 seconds. The predetermined period of time may be 10 seconds. The change in the coupling state may be from coupled to decoupled. The change in the coupling state may be from decoupled to coupled.

The at least one attribute signal may comprise a speed signal indicative of a speed of the vehicle. The at least one attribute signal may comprises a driving mode signal indicative of a driving mode of the vehicle.

An electric machine control system for a vehicle, the electric machine control system comprising one or more controllers, wherein the vehicle comprises an electric machine arranged to be selectively coupleable to provide torque to at least one wheel of an axle of the vehicle, the control system comprising: input means to receive an inhibit signal indicative of one or more inhibited coupling states; output means arranged to output a coupling signal to control coupling of the electric machine to the at least one wheel of the axle; and processing means arranged to determine a coupling state of the electric machine to the at least one wheel of the axle in dependence on the one or more inhibited coupling states, wherein the processing means is arranged to control the output means to output the coupling signal indicative of the determined coupling state when the determined coupling state is not one of the one or more inhibited coupling states. Advantageously one or more inhibited coupling states may be prevented from being selected.

An electric machine control system for a vehicle, the electric machine control system comprising one or more controllers, wherein the vehicle comprises an electric machine arranged to be selectively coupleable to provide torque to at least one wheel of an axle of the vehicle, the control system comprising: input means to receive at least one attribute signal indicative of one or more attributes of the vehicle and an inhibit signal indicative of one or more inhibited coupling states; output means arranged to output a coupling signal to control coupling of the electric machine to the at least one wheel of the axle; and processing means arranged to determine a coupling state of the electric machine to the at least one wheel of the axle in dependence on the at least one attribute signal and to compare the determined coupling state against the one or more inhibited coupling states, wherein the processing means is arranged to control the output means to output a coupling signal indicative of the determined coupling state when the determined coupling state is not one of the one or more inhibited coupling states. Advantageously, selection of one or more inhibited coupling states may be prevented.

The processing means may be arranged to allocate a higher priority to the one or more inhibited coupling states than the coupling state determined in dependence on the at least one attribute signal. Advantageously, the one or more inhibited coupling states take precedence.

The one or more coupling states may comprise one or both of coupled and decoupled. Advantageously the coupling states may be coupled and/or decoupled.

Optionally the one or more inhibited coupling states comprise one or both of coupled and decoupled. Advantageously, one or both of coupled and decoupled states may be inhibited.

The at least one attribute signal may comprise a speed signal indicative of a speed of the vehicle. Advantageously, the speed of the vehicle may be considered in determining the coupling state.

The at least one attribute signal optionally comprises a driving mode signal indicative of a driving mode of the vehicle. Advantageously, the driving mode of the vehicle may be considered in determining the coupling state.

According to another aspect of the invention, there is provided a powertrain comprising the system as described above.

According to yet another aspect of the invention, there is provided a vehicle comprising the control system as described above or the powertrain as described above.

The electric machine may be arranged to be selectively coupleable to provide torque to at least one wheel of a first axle of the vehicle. The vehicle may comprise a second motive power source arranged to provide torque to at least one wheel of a second axle of the vehicle. The second motive power source may comprise a second electric machine.

According to a further aspect of the invention, there is provided a method controlling coupling of an electric machine to provide torque to at least one wheel of an axle of a vehicle, the method comprising: receiving at least one attribute signal indicative of one or more attributes of the vehicle and an inhibit signal indicative of one or more inhibited coupling states; determining a coupling state of the electric machine to the at least one wheel of the axle in dependence on the at least one attribute signal; comparing the determined coupling state against the one or more inhibited coupling states; and outputting a coupling signal indicative of the determined coupling state to control coupling of the electric machine to the at least one wheel of the axle when the determined coupling state is not one of the one or more inhibited coupling states.

The method may comprise allocating a higher priority to the one or more inhibited coupling states than the coupling state determined in dependence on the at least one attribute signal.

The one or more coupling states may comprise coupled and decoupled.

The one or more inhibited coupling states optionally comprise one or both of coupled and decoupled.

The at least one attribute signal may comprise a speed signal indicative of a speed of the vehicle.

The at least one attribute signal optionally comprises a driving mode signal indicative of a driving mode of the vehicle.

According to another aspect of the invention, there is provided an electric machine control system for a vehicle, the electric machine control system comprising one or more controllers, wherein the vehicle comprises an electric machine arranged to be selectively coupleable to provide torque to at least one wheel of an axle of the vehicle, the control system comprising: input means to receive at least one signal indicative of selection of driving mode; output means arranged to output a coupling signal to control coupling of the electric machine to the at least one wheel of the axle; processing means arranged to determine a coupling state of the electric machine to the at least one wheel of the axle in dependence on the signal, wherein the processing means is arranged to control the output means to output the coupling signal indicative of the coupling state. Advantageously the coupling state is determined according to the driving mode of the vehicle.

An electric machine control system for a vehicle, the electric machine control system comprising one or more controllers, wherein the vehicle comprises an electric machine arranged to be selectively coupleable to provide torque to at least one wheel of an axle of the vehicle, the control system comprising: input means to receive at least one attribute signal indicative of one or more attributes of the vehicle and an efficiency signal indicative of selection of an efficiency-based driving mode; output means arranged to output a coupling signal to control coupling of the electric machine to the at least one wheel of the axle;

processing means arranged to determine a first coupling state of the electric machine to the at least one wheel of the axle in dependence on the at least one attribute signal and to determine a second coupling state of the electric machine to the at least one wheel of the axle in dependence on the at least one efficiency signal, wherein the processing means is arranged to control the output means to output the coupling signal indicative of the first and second coupling states when the same, and to output the coupling signal indicative of the first coupling state when the determined first and second coupling states differ. Advantageously, the coupling state is determined according to the selection of an efficiency-based driving mode when suitable.

The processing means may be arranged to allocate a higher priority to the first coupling state than the second coupling state. Advantageously, the coupling state is determined according to the of one or more attributes in precedence.

The one or more coupling states optionally comprise coupled and decoupled. Advantageously, the electric machine may be one of coupled to the at least one wheel, or decoupled there-from.

The at least one attribute signal may comprise a speed signal indicative of a speed of the vehicle. Advantageously, the first coupling state may be determined according to a speed of the vehicle.

According to another aspect of the invention, there is provided a powertrain comprising the system as described above.

According to another aspect of the invention, there is provided a vehicle comprising the control system as described above or the powertrain as described above.

The electric machine is optionally arranged to be selectively coupleable to provide torque to at least one wheel of a first axle of the vehicle, and the vehicle comprises a second motive power source arranged to provide torque to at least one wheel of a second axle of the vehicle. The second motive power source optionally comprises a second electric machine.

According to a further aspect of the invention, there is provided a method controlling coupling of an electric machine to provide torque to at least one wheel of an axle of a vehicle, the method comprising: receiving at least one attribute signal indicative of one or more attributes of the vehicle and an efficiency signal indicative of selection of an efficiency-based driving mode; determining a first coupling state of the electric machine to the at least one wheel of the axle in dependence on the at least one attribute signal; determining a second coupling state of the electric machine to the at least one wheel of the axle in dependence on the at least one efficiency signal; outputting a coupling signal indicative of the first and second coupling states when the same, and outputting the coupling signal indicative of the first coupling state when the determined first and second coupling states differ.

The method may comprise allocating a higher priority to the first coupling state than the second coupling state.

The one or more coupling states may comprise coupled and decoupled. The at least one attribute signal may comprise a speed signal indicative of a speed of the vehicle. The at least one attribute signal may comprise a driving mode signal indicative of a driving mode of the vehicle.

According to another aspect of the invention, there is provided computer software which, when executed by a computer, is arranged to perform a method as described above. The computer software may be stored on a computer-readable medium. The computer software may be tangibly stored on the computer readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which:

FIG. 10 shows a method according to still another embodiment of the invention;

FIG. 11 shows a method according to yet another embodiment of the invention;

DETAILED DESCRIPTION

Figure 1:
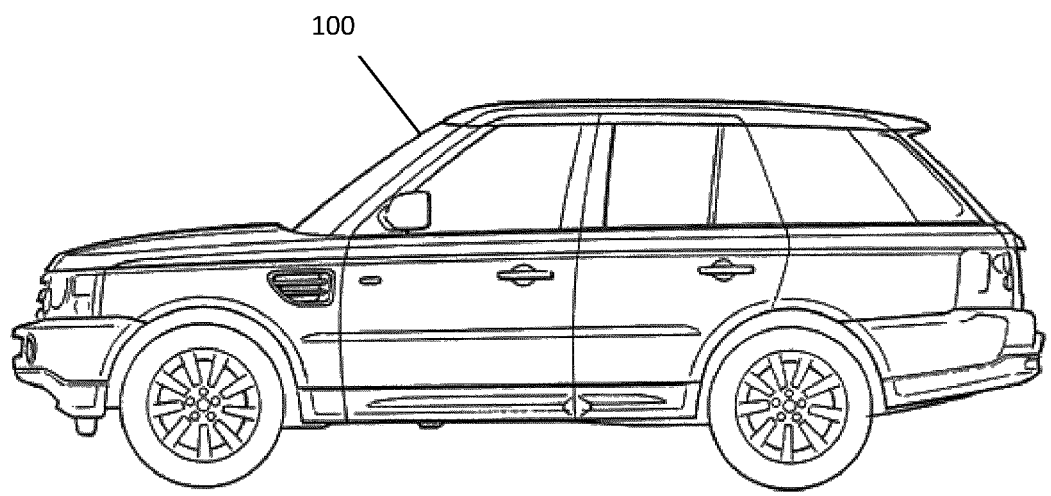
FIG. 1 shows a vehicle according to an embodiment of the invention.

FIG. 1 illustrates a vehicle 100 according to an embodiment of the invention. The vehicle 100 provides space within a cabin of the vehicle 100 for one or more occupants. In some embodiments, the vehicle 100 may be manually driven by one of the occupants representing a driver of the vehicle 100, although the vehicle 100 may have an at least partly autonomous driving capability in some embodiments. The vehicle 100 is an at least partly electric-powered vehicle 100, as will be explained, with an internal combustion engine and one or more electric machines or traction electric motors for providing motive torque, thereby the vehicle being a hybrid electric vehicle (HEV). In some embodiments the vehicle 100 may be entirely electric powered i.e. a battery electric vehicle (BEV) without an internal combustion engine.

Figure 2:
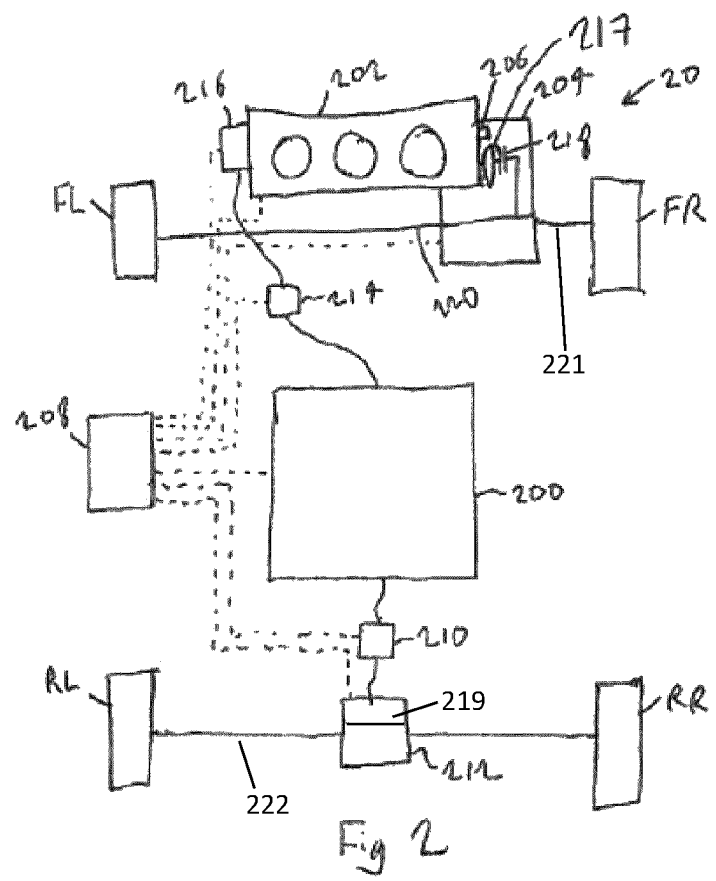
FIG. 2 shows a system according to an embodiment of the invention.

FIG. 2 illustrates a system 20 for a parallel HEV 10. The system 20 defines, at least in part, a powertrain of the HEV. The system 20 comprises a control system 208. The control system 208 comprises one or more controllers. The control system 208 may comprise one or more of: a hybrid powertrain control module; an engine control unit; a transmission control unit; a traction battery management system; and/or the like. The system 20 comprises an engine 202. The engine 202 is a combustion engine. The illustrated engine 202 is an internal combustion engine. The illustrated engine 202 comprises three combustion chambers, however a different number of combustion chambers may be provided in other examples.

The engine 202 is operably coupled to the control system 208 to enable the control system 208 to control output torque of the engine 202. The output torque of the engine 202 may be controlled by controlling one or more of: air-fuel ratio; spark timing; poppet valve lift; poppet valve timing; throttle opening position; fuel pressure; turbocharger boost pressure; and/or the like, depending on the type of engine 202.

The system 20 comprises a vehicle transmission arrangement 204 for receiving output torque from the engine 202. The vehicle transmission arrangement 204 may comprise an automatic vehicle transmission or a semi-automatic vehicle transmission. The vehicle transmission arrangement 204 comprises a fluid-coupling torque converter 217 between the engine 202 and a gear train.

The system 20 may comprise a differential (not shown) for receiving output torque from the gear train. The differential may be integrated into the vehicle transmission arrangement 204 as a transaxle, or provided separately.

The engine 202 is mechanically connected or connectable to a first set of vehicle wheels (FL, FR) via a first torque path 220. The first torque path 220 extends from an output of the engine 202 to the vehicle transmission arrangement 204, then to axles/driveshafts, and then to the first set of vehicle wheels (FL, FR). In a vehicle overrun and/or friction braking situation, torque may flow from the first set of vehicle wheels (FL, FR) to the engine 202. Torque flow towards the first set of vehicle wheels (FL, FR) is positive torque, and torque flow from the first set of vehicle wheels (FL, FR) is negative torque.

The illustrated first set of vehicle wheels (FL, FR) comprises front wheels, and the axles are front transverse axles. Therefore, the system 20 is configured for front wheel drive by the engine 202. In another example, the first set of vehicle wheels (FL, FR) comprises rear wheels (RL, RR). The illustrated first set of vehicle wheels (FL, FR) is a pair of vehicle wheels, however a different number of vehicle wheels could be provided in other examples.

In the illustrated system 20, no longitudinal (centre) driveshaft is provided, to make room for hybrid vehicle components. Therefore, the engine 202 is not connectable to a second set of rear wheels (rear wheels RL, RR in the illustration). The engine 202 may be transverse mounted to save space.

A torque path connector 218 such as a clutch is provided inside and/or outside a bell housing of the vehicle transmission arrangement 204. The clutch 218 is configured to connect and configured to disconnect the torque path 220 between the engine 202 and the first set of vehicle wheels (FL, FR). The system 20 may be configured to automatically actuate the clutch 218 without user intervention.

The system 20 comprises a first electric traction motor 216. The first electric traction motor 216 may be an alternating current induction motor or a permanent magnet motor, or another type of motor. The first electric traction motor 216 is located to the engine side of the clutch 218.

The first electric traction motor 216 may be mechanically coupled to the engine 202 via a belt or chain. For example, the first electric traction motor 216 may be a belt integrated starter generator (BiSG). In the illustration, the first electric traction motor 216 is located at an accessory drive end of the engine 202, opposite a vehicle transmission end of the engine 202. In an alternative example, the first electric traction motor 216 is a crankshaft integrated motor generator, located at a vehicle transmission end of the engine 202.

The first electric traction motor 216 is configured to apply positive torque and configured to apply negative torque to a crankshaft of the engine 202, for example to provide functions such as: boosting output torque of the engine 202; deactivating (shutting off) the engine 202 while at a stop or coasting; activating (starting) the engine 202; and regenerative braking in a regeneration mode. In a hybrid electric vehicle mode, the engine 202 and first electric traction motor 216 are both operable to supply positive torque simultaneously to boost output torque. The first electric traction motor 216 may be incapable of sustained electric-only driving, although in other embodiments the first electric traction motor 216 may be capable of electric only driving particularly an embodiment without the engine 202. One or both of the engine 202 and the first electric traction motor 216 are able to provide torque to a first axle 221 of the vehicle.

However, when the torque path 220 between the engine 202 and the first set of vehicle wheels (FL, FR) is disconnected, a torque path 220 between the first electric traction motor 216 and the first set of vehicle wheels (FL, FR) is also disconnected.

FIG. 2 illustrates a second electric traction motor 212 configured to enable at least an electric vehicle mode comprising electric-only driving. In some, but not necessarily all examples, a nominal maximum torque of the second electric traction motor 212 is greater than a nominal maximum torque of the first electric traction motor 216.

Even if the torque path 220 between the engine 202 and the first set of vehicle wheels (FL, FR) is disconnected by the clutch 218, the vehicle 10 can be driven in electric vehicle mode because the second electric traction motor 212 is connected to at least one vehicle wheel. The at least one vehicle wheel may be one, or both, of the rear wheels (RL, RR) of the vehicle 100 associated with a second axle 222 of the vehicle 100.

The illustrated second electric traction motor 212 is configured to provide torque to the illustrated second set of vehicle wheels (RL, RR) of the second axle 222 of the vehicle. The second set of vehicle wheels (RL, RR) comprises vehicle wheels not from the first set of vehicle wheels (FL, FR). The illustrated second set of vehicle wheels (RL, RR) comprises rear wheels, and the second electric traction motor 212 is operable to provide torque to the rear wheels (RL, RR) via rear transverse axles forming the second axle 222. Therefore, the vehicle 10 may be rear wheel driven in electric vehicle mode.

The control system 208 may be configured to disconnect the torque path 220 between the engine 202 and the first set of vehicle wheels (FL, FR) in electric vehicle mode, to reduce parasitic pumping energy losses. For example, the clutch 218 may be opened. In the example of FIG. 2, this means that the first electric traction motor 216 will also be disconnected from the first set of vehicle wheels (FL, FR).

Another benefit of the second electric traction motor 212 is that the second electric traction motor 212 may also be configured to operable in a hybrid electric vehicle mode, to enable four-wheel drive operation despite the absence of a centre driveshaft.

The second electric traction motor 212 may be selectively coupled to one or both wheels RL, RR of the second axle 222. Coupling of a torque path between the second electric traction motor 212 and the one or both wheels RL, RR of the second axle 222 may be achieved via a second clutch 219. The second clutch 219 may be controlled to open, such as via an actuator under control of a received signal, to disconnect the torque path between the second electric traction motor 212 and the one or both wheels (RL, RR) of the second axle 222. In some embodiments the second clutch 219 may be a dog cutch.

Thus it will be appreciated that the second electric traction motor 212 is arranged to be selectively coupleable to provide torque to at least one wheel (RL, RR) of an axle of the vehicle 100. In some embodiments, the vehicle 100 comprises another motive power source arranged to provide torque to at least one wheel (FL, FR) of another axle of the vehicle 100. In the illustrated embodiment the another motive power source power source comprises another electric machine 216 in the form of the first electric traction motor 216. The another motive power source may, in some embodiments, comprise an internal combustion engine 202 which may provide positive torque alone or in combination with the first electric traction motor 216.

In order to store electrical power for the electric traction motors 212, 216, the system 20 comprises a traction battery 200. The traction battery 200 provides a nominal voltage required by electrical power users such as the electric traction motors. If the electric traction motors 212, 216 run at different voltages, DC-DC converters (not shown) or the like may be provided to convert voltages.

The traction battery 200 may be a high voltage (HV) battery. High voltage traction batteries provide nominal voltages in the hundreds of volts, as opposed to traction batteries for mild HEVs which provide nominal voltages in the tens of volts. The traction battery 200 may have a voltage and capacity to support electric only driving for sustained distances. The traction battery 200 may have a capacity of several kilowatt-hours, to maximise range. The capacity may be in the tens of kilowatt-hours, or in the hundreds of kilowatt-hours.

Although the traction battery 200 is illustrated as one entity, the function of the traction battery 200 could be implemented using a plurality of small traction batteries in different locations on the vehicle 10.

In some examples, the first electric traction motor 216 and second electric traction motor 212 may be configured to receive electrical energy from the same traction battery 200. By pairing the first (mild) electric traction motor 216 to a high-capacity battery (tens to hundreds of kilowatt-hours), the first electric traction motor 216 may be able to provide the functionality of the methods described herein for sustained periods of time, rather than for short bursts. In another example, the electric traction motors 212, 216 may be paired to different traction batteries.

Finally, the illustrated system 20 comprises one or more inverters. Two inverters 210, 214 are shown, one for each electric traction motor 212, 216. In other examples, one inverter or more than two inverters could be provided.

It can be appreciated from the foregoing that the vehicle 100 may be provided with motive torque from a combination of sources. Embodiments of the present invention relate to determining which of the sources of motive torque to utilise.

Figure 3:
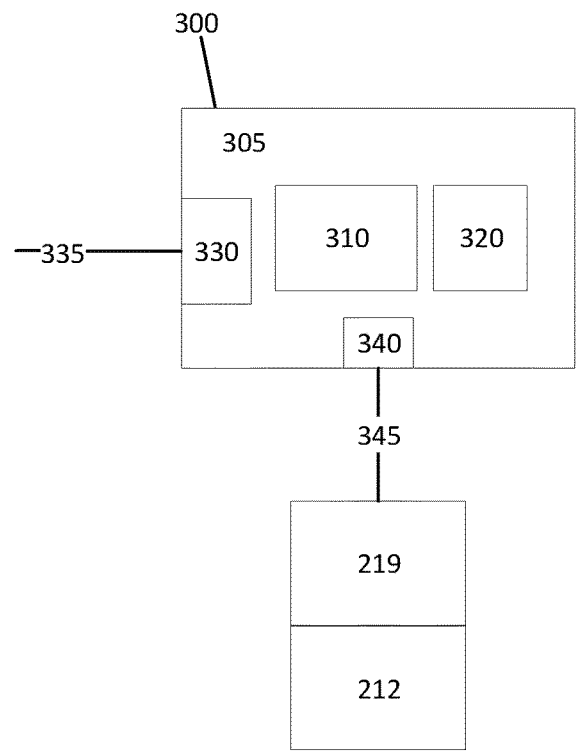
FIG. 3 shows a control system according to an embodiment of the invention.

FIG. 3 illustrates a control system 300 according to an embodiment of the invention. The control system 300 may be formed by one or more controllers 305. The control system 300 illustrated in FIG. 2 comprises one electronic controller 305 although it will be appreciated that this is merely illustrative. The, or each, controller 305, comprises a processing means 310 and a memory means 320. The processing means 310 may be one or more electronic processors 310 or processing devices 310, such as CPUs, for executing computer readable instructions. The memory means 320 may be one or more memory devices 320. The one or more memory devices 320 may store computer-readable instructions for execution by the at least one processing device 310.

The controller 305 comprises an input means 330 and an output means 340. The input means 330 is arranged to receive one or more signals 335. The input means 330 may be an electrical input to the controller 305 for receiving one or more electrical signals 335. The output means 340 is arranged to output at least one signal 345, which is provided in FIG. 3 to one or both of the second clutch 219 and second electric traction motor 212 to control coupling to the second torque path to provide torque to one or both wheels of the second axle 222. The output means 340 is an electrical output of the controller 305. The output means 340 is operable by the processing device 310 to output the signal 345 under control thereof. The signal 345 may cause the second electric traction motor 212 to 'spin-up' or accelerate to a rotation speed suitable to couple with the second axle 222 i.e. bearing in mind that the vehicle 100 may be in motion through torque provided by the first electric traction motor 216 and/or engine 202. The signal 345 may cause closing of the second clutch 219 to couple the second electric traction motor 212 to the second torque path.

The electrical input 330 and output 340 of the controller 305 may be provided to/from a communication bus or network of the vehicle, such as a CANBus or other communication network which may, for example, be implemented by an Internet Protocol (IP) based network such as Ethernet, or FlexRay or a Single Edge Nibble Transmission (SENT) protocol, although other protocols may be used.

Figure 4:
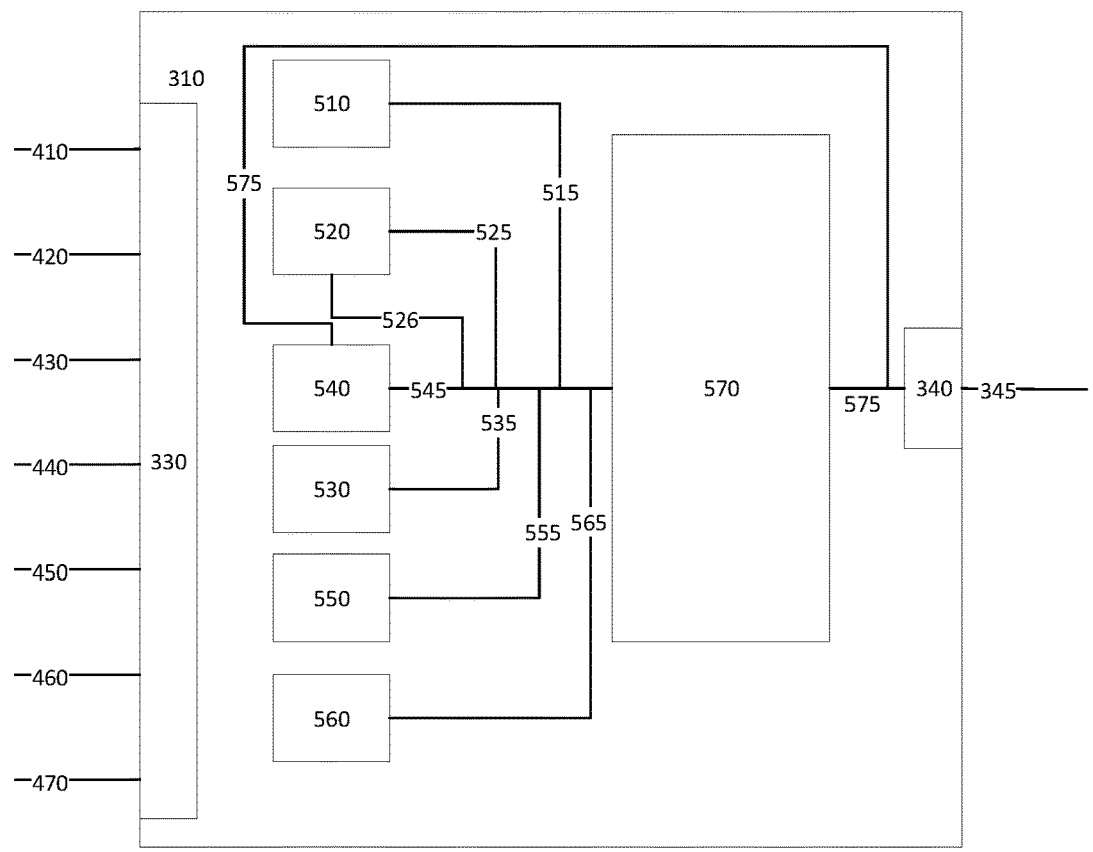
FIG. 4 shows an illustration of modules of the control system according to embodiments of the invention.

FIG. 4 schematically illustrates a portion of the controller 305 comprising the input means 330 and output means 340 of the system 300. FIG. 4 illustrates inputs 410, 420, 430, 440, 450, 460, 470 to the input means 330 of the controller 305 which form the signal 335 illustrated in FIG. 3. FIG. 4 further illustrates modules 510, 520, 530, 540, 550, 560, 570, or functional units, which may operatively execute on the processing device 310 of the controller 305. Each of the inputs 410, 420, 430, 440, 450, 460, 470 provides information relating to one or more aspects or attributes of the vehicle 100 or the powertrain 20 thereof.

The inputs 410, 420, 430, 440, 450, 460, 470 may comprise one more of one or more speed signals 410, a temperature signal 420, a fault-derived coupling state request (FDCSR) signal 430, a driving mode (DM) signal 440, a state of charge (SoC) signal 450 and an inhibit signal 460 which provide information or data on which a desired coupling state is determined by one or more of the modules 510, 520, 530, 540, 550, 560, 570 as will be explained. The desired coupling state is a desired coupling of the torque path between the second electric traction motor 212 and the one or both wheels RL, RR of the second axle 222 of the vehicle 100 which is determined by one or more of the modules 510, 520, 530, 540, 550, 560, 570.

The one or more speed signals 410 is indicative of one or more of a speed of the vehicle 100 i.e. a speed of the vehicle 100 over ground, a wheel speed signal indicative of a speed of rotation of one or more wheels of the vehicle and a motor speed signal indicative of a speed of one or both of the speed of the first and second electric traction motors 216, 212.

The temperature signal 420 is indicative of one or more of an ambient temperature and a temperature of one or more units, or a temperature of fluids associated with one or more units, particularly fluids used for cooling said units i.e. coolant fluid, of the vehicle 100. For example the coolant fluid may be a coolant fluid of one or both traction electric motors 212, 216. In some embodiments, the temperature signal 420 comprises a temperature associated with one more units of the powertrain. In some embodiments, the temperature associated with one more units of the powertrain comprises a temperature of one or more of one or both of the inverters 210, 214, one or both of the electric traction motors 212, 216, a coolant temperature, and an indication of a temperature of the traction battery 200. The indication of the temperature of the traction battery 200 may be indicative of a power capability of the traction battery 200, which is a function of temperature and a State of Charge (SoC) of the traction battery 200. Thus in some embodiments the temperature signal 420 may comprise a signal indicative of the power capability of the traction battery 200, this being indicative of temperature.

The fault-derived coupling state request signal (FDCSR) 430 is indicative of a request for a coupling state derived in determination of a fault associated with the vehicle 100, such as a fault associated with the powertrain. For example, where a fault associated with the second clutch 219 is detected by a fault management module (not shown), the fault management module may request that a coupling state of coupled or decoupled in order to control a state of the clutch 219 i.e. open or closed, in order to manage or resolve the fault. Other faults may be appreciated to cause a desired coupling state to manage or ameliorate the fault. In some embodiments, a fault management module 530 may be executed upon the processing device 310 and thus the FDSCR signal 430 may be generated internal to the controller 305.

The driving mode signal 440 may be indicative of a driving mode of the vehicle 100 which may be automatically determined, such as by an intelligent driving mode or terrain response (TR) determination unit, an autonomous driving controller, such as an ADAS system, or selected by an occupant of the vehicle 100. The driving mode signal 440 may be indicative of selection of an efficiency-based driving mode i.e. to provide minimal fuel and/or energy usage, a four wheel-drive driving mode, such as where a number of driven wheels may be automatically selected, and a selected driving gear i.e. neutral, drive (D), reverse (R) etc.

The state of charge (SoC) signal 450 is indicative of the SoC of the traction battery 200.

The inhibit signal 460 is indicative of one or more inhibited coupling states. For example, the inhibit signal 460 may indicate that a state of coupled is inhibited to prevent coupling of the second electric traction motor 212 to the one or both wheels (RL, RR) of the second axle 222, or that a state of decoupled is inhibited to prevent decoupling of the second electric traction motor 212 from the one or both wheels (RL, RR) of the second axle 222.

The inputs 410, 420, 430, 440, 450, 460, 470 may, in some embodiments, comprise a coupling status signal 470 which is indicative of an actual coupling status of the second electric traction motor 212 to the one or both wheels of the second axle 222. In some embodiments, the coupling status signal 470 has states of coupled and decoupled indicative the respective coupling. The coupling status signal 470 reports the physical status of the coupling of the second electric traction motor 212 to the second torque path via the second axle 222 and is thus indicative of successful coupling or decoupling of the second electric traction motor 212.

In some embodiments, the modules 510, 520, 530, 540, 550, 560, 570 comprise a high-speed module 510, a low-speed module 520, a fault management module (FMM) 530, an anti-fussiness module 540, an inhibit module 550, a driving mode module (DMM) 560 and an arbitrator 570. It will be appreciated that not all modules are present in all embodiments, thus embodiments of the present invention may comprise one or more of the aforementioned modules. Each of the modules will be explained below. Each of the high-speed module 510, the low-speed module 520, the fault management module 530, the anti-fussiness module 540, the inhibit module 550, the efficiency module 560, as present in the relevant embodiment, may determine a respective desired coupling state. An indication of the desired coupling state is provided to the arbitrator 570 to determine the coupling state of the electric machine 212 to the axle 222 i.e. as an arbitrated coupling state.

An embodiment of the high-speed module (HSM) 510 will now be explained with reference to FIGS. 5 & 6. The HSM 510 is operatively executable by the processing device 310 to determine a coupling state of the electric machine 212 to the at least one wheel of the axle 222 in dependence on the speed signal 410 indicative of the speed of the vehicle 100. In some embodiments, the HSM 510 and the arbitrator 570 are arranged to cause the controller 305 to output a coupling signal 345 to control coupling of the second electric traction motor 212 to the at least one wheel of the axle 222 dependent on the speed signal 410 as will be explained. The HSM 510 is arranged to cause decoupling of the second electric traction motor 212 from the at least one wheel of the axle 222 a high-speeds of the vehicle 100 which, advantageously, prevents rotation of the second electric traction motor 212 at excessive speeds which may damage the second electric traction motor 212.

Figure 5:
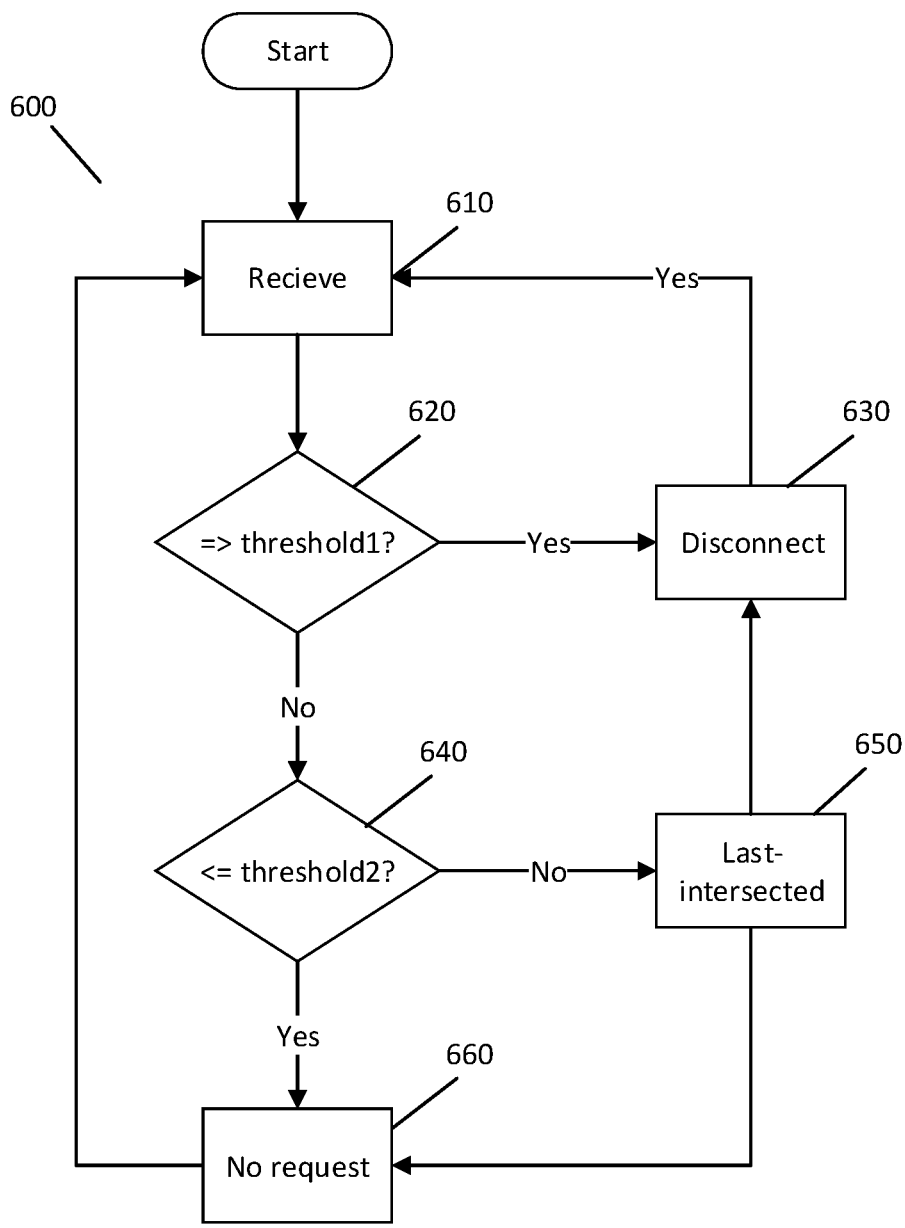
FIG. 5 shows a method according to an embodiment of the invention.

FIG. 5 illustrates a method 600 according to an embodiment of the invention which may be performed by the HSM 510 executed by the processing device 310 of the controller 305. The method 600 will be explained with reference to FIG. 6 which illustrates a speed of the vehicle 100, as indicated by the speed signal 410, over a period of time. Also illustrated in a lower portion of FIG. 6 is a desired coupling signal 515 output by the HSM 510 which represents a request 730, 740 for the desired coupling state from the HSM 510 determined in dependence on the speed signal 410.

The method 600 comprises a step 610 of receiving one or more signals, such as data representing the one or more signals, at the HSM 510. In the illustrated embodiment the HSM 510 is arranged to receive the speed signal 410, which as discussed above may be indicative of the speed of the vehicle 100. In some embodiments, the HSM 510 is arranged to receive the temperature signal 420 as discussed above. In some embodiments, the HSM 510 is arranged to receive the SoC signal 460 indicative of the state of charge of one or more traction batteries 200 for providing electrical power to the traction electric machines 212, 216. In some embodiments, the HSM 510 may receive a signal indicative of a power limit or capability of the traction battery 200 which, as discussed above, is indicative of the temperature of the traction battery 200.

Step 620 comprises determining a desired coupling state of the second electric traction motor 212 to the at least one wheel (RL, RR) of the second axle 222 in dependence on the speed signal 410. Step 620 comprises determining whether the speed of the vehicle 100 is equal to or greater than a first high-speed threshold 710 shown in FIG. 6. Thus step 620 comprises comparing the speed of the vehicle 100 against one or more thresholds 710, 720, where the one or more thresholds 710, 720 comprise the first high-speed threshold 710. In some embodiments, the one or more thresholds 710, 720 comprise a second high-speed threshold 720. The second high-speed threshold 720 represents a vehicle speed lower than the first high-speed threshold 710. The first 710 and second 720 high-speed thresholds are illustrated in FIG. 6.

If the speed of the vehicle 100 is equal to or greater than a first high-speed threshold 710 then the method 600 moves to step 630. If, however, the speed of the vehicle 100 is less than the first high-speed threshold 710 then the method 600 moves to step 640.

Figure 6:
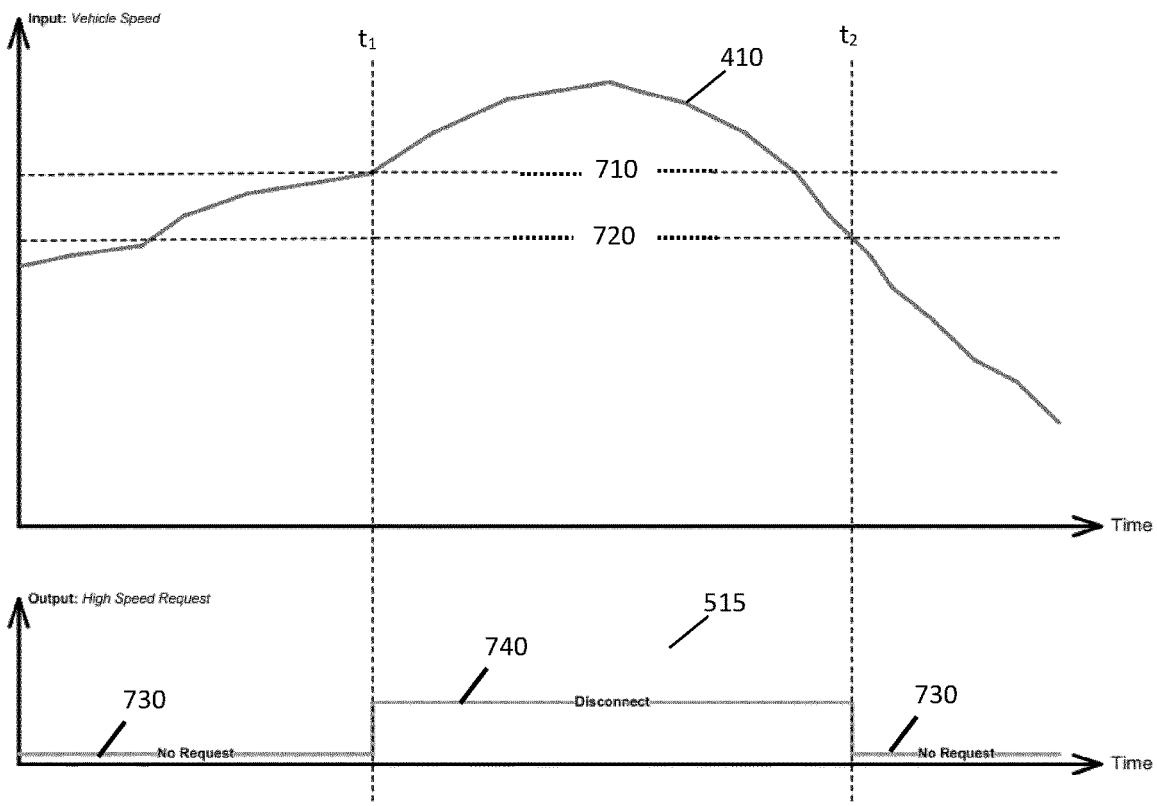
FIG. 6 illustrates operation of a module according to an embodiment of the invention.

In the example of FIG. 6, the method 600 progresses to step 640 prior to time $t_1$. Prior to time $t^1$ as will be appreciated the vehicle 100 is generally accelerating which may be caused by positive torque applied by the first electric traction motor 216 and/or engine 202, and the second electric traction motor 212 which is coupled to the second torque path via the second axle 222.

In step 630 the desired coupling state is determined as decoupled in dependence on the speed signal 410 being indicative of a vehicle speed equal to or greater than the first high-speed threshold 710. In step 630 the HSM 510 may output an indication 515 of the desired coupling state of decoupled to the arbitrator 570 indicative of a request to decouple 740 the second electric traction motor 212 from the second axle 222. The indication 515 of the desired coupling state of decoupled 740 may be referred to as the high-speed coupling state request 515, 740. The arbitrator 570 may in some embodiments arbitrate between multiple requests for desired coupling states as will be explained. In the absence of any other competing requests from other modules, the arbitrator 570 is arranged to output, via the output means 340, the high-speed coupling state request 515 for the decoupled state 740 as output signal 345. In some embodiments, the high-speed coupling state request 515 may be provided from the HSM 510 directly to the output means 340 of the controller 305.

After time $t_1$, i.e. once the speed of the vehicle 100 exceeds the first high-speed threshold 710, it has been determined that it is desirable to decouple the second electric traction motor 212. Continued coupling of the second electric traction motor 212 to the wheel(s) of the vehicle 100 causes the second electric traction motor 212 to exceed a predetermined rotation speed. The predetermined rotation speed may be a motor speed of 12,000 rpm, although it will be appreciated that other predetermined rotation speeds may be selected. The predetermined rotation speed may correspond to a vehicle speed of 140 kmh$^{-1}$ although it will be appreciated that this depends on a gearing between the second electric traction motor 212 and the wheels of the vehicle 100 and a diameter of the wheels. Furthermore, in some embodiments, the vehicle speed corresponding to the first high speed threshold 710, and thus the rotation speed of the second electric traction motor 212, may be determined in dependence on temperature as will be explained with reference to FIG. 7.

The output means 340 of the controller 305 is arranged to output the coupling signal 345, 730, 740 indicative of a request to decouple 740 the second electric traction motor 212 from the at least one wheel of the second axle 222 in dependence on the desired coupling state being decoupled.

If, in step 620, the speed of the vehicle 100 is less than the first high speed threshold 710, the method moves to step 640. In step 640 it is determined whether the speed of the vehicle 100 is less than or equal to the second high speed threshold 720. If the speed of the vehicle 100 is less than or equal to the second high speed threshold 720 the method moves to step 660.

In step 660 the HSM 510 is arranged not to request a desired coupling state of the second electric machine 212. The HSM 510 outputs a request for a coupling state to the arbitrator 570 or may, as illustrated in FIG. 5, output a 'no-request' signal 730 to the arbitrator 570, where the no-request signal 730 is indicative of the HSM 510 not requesting a specific coupling state of the second electric traction motor 212 to the one or more wheels of the second axle 222. Thus, prior to time $t_1$ in FIG. 6, the HSM 510 outputs the no-request signal 730 to the arbitrator 570, or may output no signal to the arbitrator 570 in other embodiments. The arbitrator 570 may have a default coupling state. The default coupling state may be coupled i.e. for the second electric traction motor 212 to be coupled to the torque path of the second axle 222. Thus when either a 'no-request' signal 730, or no request signal is received by the arbitrator 570, the arbitrator 570 may output a determined coupling request via the output means 340.

In some embodiments, the HSM 510 is arranged to output the coupling signal 345, indicative of a request to couple the second electric traction motor 212 machine to the at least one wheel of the second axle 222. It will be appreciated that the HSM 510 may, in some embodiments, request the default state of coupled when the speed signal 410 is indicative of a low vehicle speed.

In some embodiments, the HSM 510 may apply hysteresis to the speed signal 410 to determine the coupling state. That is, the coupling state of decoupled may be determined for a vehicle speed greater than that at which the second electric traction motor 212 is recoupled to the torque path via the second axle 222 i.e. above the second high-speed threshold 720. Advantageously this assists in preventing 'hunting' or 'flickering' between the decoupled and coupled states as the speed of the vehicle varies around (above and below) the first high speed threshold 710. Use of the second high speed threshold 720 provides the hysteresis in some embodiments. As can be appreciated from FIG. 6, between $t_1$ and prior to time $t_2$ the vehicle deaccelerates from a peak speed, such that the speed signal 410 drops below the first high speed threshold 710. As can be appreciated from the lower portion of FIG. 6, the 'no-request' signal 730 is not output immediately upon the speed of the vehicle 100 falling below the first high-speed threshold 710.

Instead, in a region between the first and second high speed thresholds 710, 720 the coupling state of decoupled 740 is maintained until the vehicle speed falls below the second high-speed threshold 720. In step 650, which is reached when the vehicle speed is between the first and second high speed thresholds 710, 720 the desired coupling state is determined in dependence on the speed signal 410 in dependence on a last intersected of the first and second high-speed thresholds 710, 720. Thus, prior to time $t_2$ when the speed signal 410 is below the first high-speed threshold 710 the coupling state is determined in step 650 as decoupled based on last-intersecting the first high speed threshold 710. Thus the method moves to step 630. Similarly, prior to time $t_1$, when the speed signal 410 is above the second high-speed threshold 720, the method moves to step 660 wherein the 'no request' output signal 730 is maintained such that the arbitrator 570 in the example embodiment determines the coupling state as coupled.

Thus it can be appreciated that embodiments of the invention select coupling of the second electric traction motor 212 in dependence on the speed of the vehicle 100.

Figure 7:
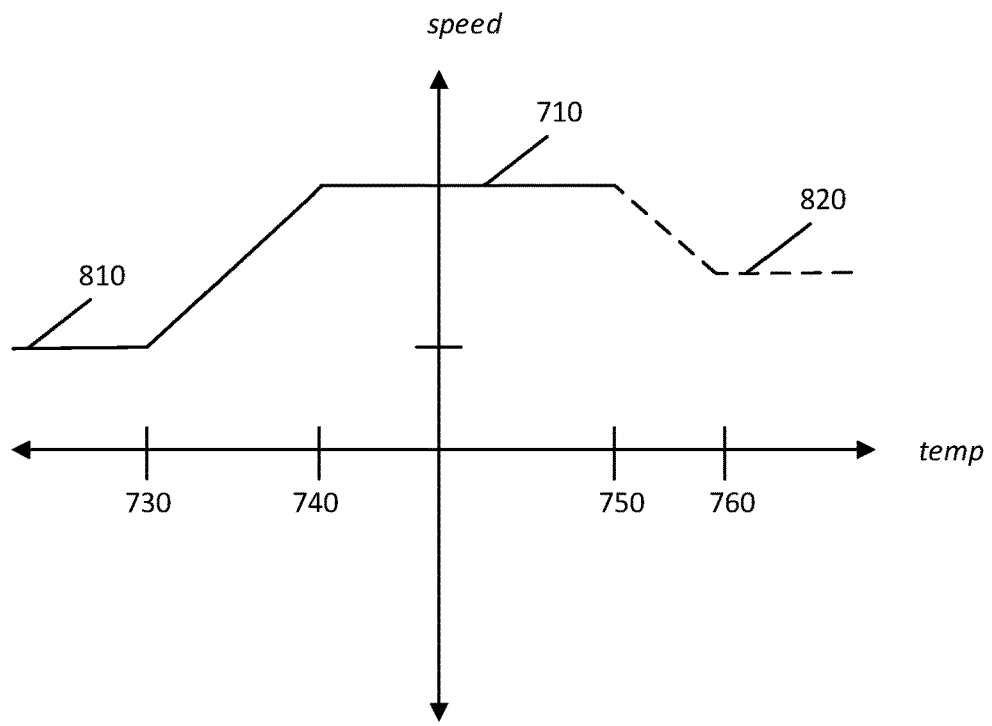
FIG. 7 further illustrates operation of a module according to an embodiment of the invention.

FIG. 7 illustrates motor speed, i.e. speed (RPM) of the second electric traction motor 121, against temperature according to an embodiment of the invention. Illustrated in FIG. 7 is the first high speed threshold 710 which, according to some embodiments of the invention varies dependent upon temperature. As described above, in some embodiments of the invention the controller 305 receives the temperature signal 420. In some embodiments, the first high speed threshold 710 adopts a first value 710 between first and second temperatures 740, 750. The first temperature 740, below which one or both of the first and second high-speed thresholds 710, 720 reduces may correspond to a cold-temperature, such as a temperature below 0° C., such as −5° C., although it will be realised that other temperatures may be selected. It will be appreciated that, although not illustrated, the second high speed threshold 720 may follow the first high speed threshold 710.

Below the first temperature 740, in some embodiments the first high speed threshold 710 reduces i.e. to value 810, such that the coupling state of the second electric traction motor 212 is determined as decoupled at a lower speed, as illustrated. In some embodiments, one or both of the first and second high-speed thresholds 710, 720 may reduce proportional to temperature during one or more temperature regions. Advantageously, the reduction in the first high speed threshold 710, 810 allows for changes in, for example, coolant of the second electric traction motor 212 or a reduced viscosity of fluids associated with the second torque path via the second axle 222, such that rotation of the motor 212 may consume more energy and therefore lower-speed decoupling is more efficient. In the embodiment shown in FIG. 7, the first high speed threshold 710, 810 is arranged to decrease in dependence on temperature over a first temperature range 740, 730. The temperature range may be between −10° C. and −20° C., although other temperature ranges may be selected. In other embodiments, the first high speed threshold 710 may reduce instantaneously, however advantageously having a gradual change may be less noticeable to occupants of the vehicle 100. Below a third temperature 730 the first thigh speed threshold 810 corresponds to a minimum threshold speed 810.

Similarly, in some embodiments, above the second temperature 750 the first thigh speed threshold 710 is arranged to decrease in dependence on temperature over a second temperature range 750, 760 to a fourth temperature 760. Above the fourth temperature 760 the first thigh speed threshold 710 adopts a constant value 820 in some embodiments, which may be different to the minimum threshold speed 810 as shown in FIG. 7, although in other embodiments the two speeds 810, 820 may be equal. Advantageously the reduction in the first thigh speed threshold 710, 820 at higher speeds may reduce cooling issues associated with the second electric traction motor 212. The temperature 750 may be at least 25° C. or at least 35° C., such as in some embodiments a temperature of between 50° C. and 60° C.

As described above, in some embodiments, the controller 305 is arranged to receive the SoC signal 450. In some embodiments, one or both the first high speed threshold 710 and second high speed threshold 720 is determined in dependence on the SoC of the traction battery 200. As described above, in some embodiments, the arbitrator 570 may be arranged to achieve the default coupling state of coupled in absence of a request from the HSM 510 for the decoupled state. In this way, the HSM 510 and arbitrator 570 operate to decouple the second electric traction motor 212 when the vehicle 100 speed is above first high speed threshold 710 and coupled when the vehicle 100 speed is below the second high speed threshold 720. To couple the second electric traction motor 212 to the second axle in some embodiments the second electric traction motor 212 is required to 'spin-up' or accelerate from a low, such as zero, rotation speed to generally a speed of rotation of the rear axle 222 before the second clutch 219 can be closed to couple the second electric traction motor 212 to the axle 222. As can be appreciated, accelerating the second electric traction motor 212 consumes energy from the traction battery 200. When the vehicle 100 is operative with a traction battery 200 having a low SoC, one or both the first high speed threshold 710 and second high speed threshold 720 may be reduced in dependence on the SoC. Advantageously, by reducing the speed corresponding to one or both the first high speed threshold 710 and second high speed threshold 720, the second electric traction motor 212 is only required to 'spin-up' to a lower rotation speed to recouple to the second axle 222, thereby requiring less energy consumption when the traction battery 200 has a lower SoC.

An embodiment of the low-speed module (LSM) 520 will now be explained with reference to FIGS. 8 and 9. The LSM 520 is operatively executable by the processing device 310 to determine a coupling state of the electric machine 212 to the at least one wheel of the second axle 222 in dependence on the speed signal 410 indicative of the speed of the vehicle 100. In some embodiments, the LSM 510 and arbitrator 570 are arranged to cause the controller 305 to output a coupling signal 345 to control coupling of the electric machine 212 to the at least one wheel of the second axle 222 dependent on the speed signal 410, as will be explained. As will be explained the LSM 520 is arranged to cause coupling of the electric machine 212 to the at least one wheel of the axle 222 a low-speeds which, advantageously, enables the electric machine 212 to provide motive torque for the vehicle at low speeds, especially from stationary. Furthermore, the LSM 520 is arranged to control the coupling of the electric machine to avoid, or reduce, undesirable characteristics which may be noticeable to an occupant of the vehicle 100 as will be explained.

Figure 8:
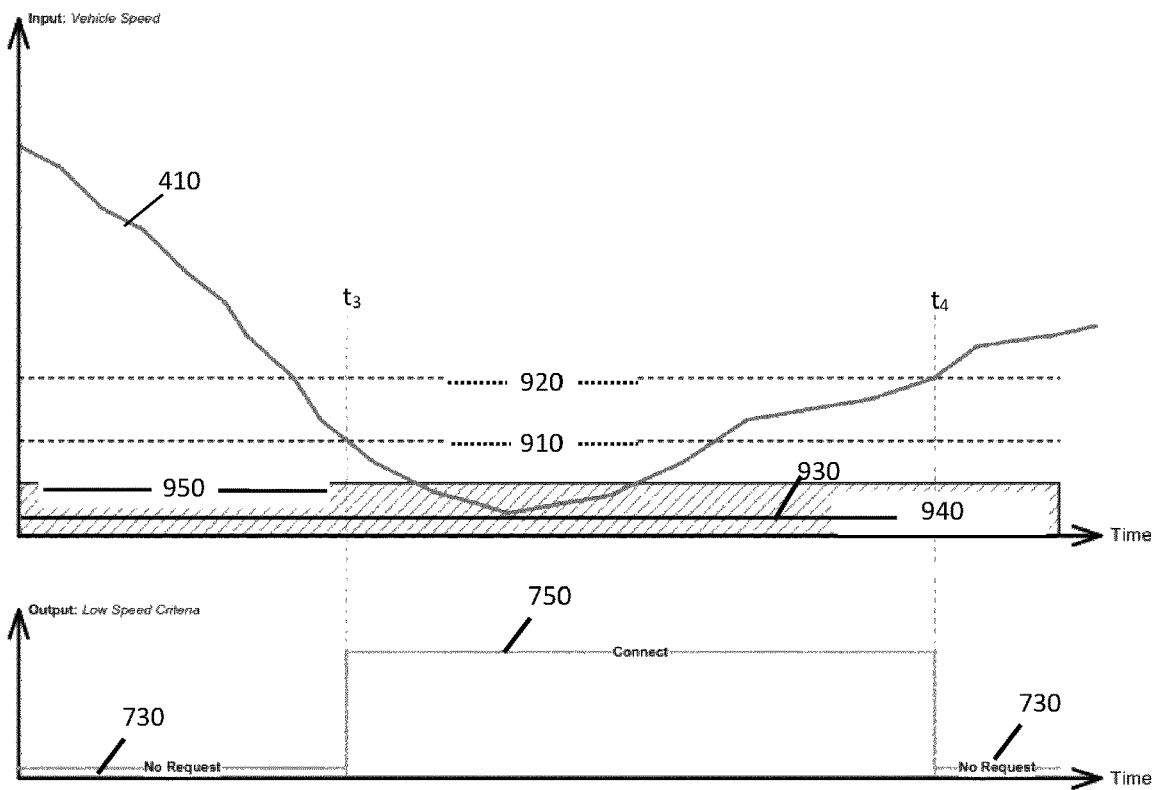
FIG. 8 illustrates operation of another module according to an embodiment of the invention.
Figure 9:
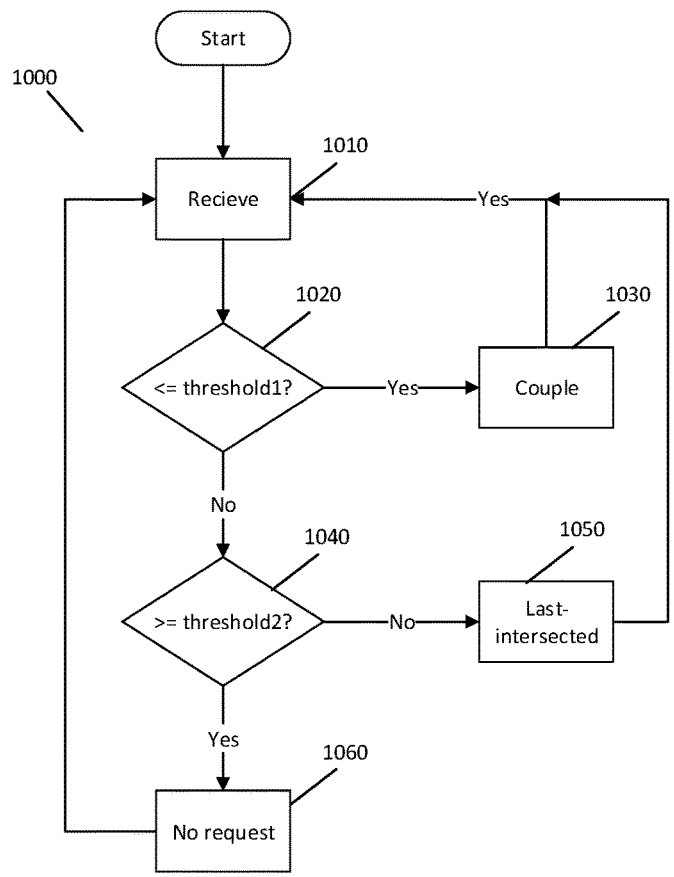
FIG. 9 shows a method according to another embodiment of the invention.

FIG. 9 illustrates a method 1000 according to an embodiment of the invention which may be performed by the LSM 520 executed by the processing device 310 of the controller 305. The method 1000 will be explained with reference to FIG. 8 which illustrates a speed of the vehicle 100, as indicated by the speed signal 410, over a period of time. Also illustrated in a lower portion of FIG. 8 is a desired coupling signal 525 output by the LSM 520 which represents a request 730, 750 for the desired coupling state from the LSM 520 determined in dependence on the speed signal 410.

The method 1000 comprises a step 1010 of receiving one or more signals, such as data representing the one or more signals, at the LSM 520. In the illustrated embodiment the LSM 520 is arranged to receive the speed signal 410 indicative of the speed of the vehicle 100.

Step 1020 comprises determining a desired coupling state of the second electric traction motor 212 to the at least one wheel (RL, RR) of the second axle 222 in dependence on the speed signal 410. Step 1020 comprises determining whether the speed of the vehicle 100 is equal to or less than a first low-speed threshold (LST) 910. Thus step 1020 comprises comparing the speed of the vehicle 100 against one or more thresholds 910, 920, where the one or more thresholds 910, 920 comprise the first LST 910. In some embodiments, the one or more low-speed thresholds 910, 920 comprise a second LST 920, as shown in FIG. 8. The second LST 920 represents a vehicle speed greater than the first LST 910. The first 910 and second 920 LSTs are illustrated in FIG. 8.

In step 1030 the desired coupling state is determined as coupled in dependence on the speed signal 410 being indicative of a vehicle speed equal to or below than the first LST 910. In step 1030 the LSM 520 may output an indication 525 of the desired coupling state of coupled to the arbitrator 570 indicative of a request to couple 750 the second electric traction motor 212 to the second axle 222. The indication 525 of the desired coupling state of coupled 750 may be referred to as the low-speed coupling state request 525, 750. The arbitrator 570 may in some embodiments arbitrate between multiple requests for desired coupling states. In the absence of any other competing requests from other modules, the arbitrator 570 is arranged to output, via the output means 340, the low-speed coupling state request 525 for the coupled state 750 as output signal 345. In some embodiments, the low-speed coupling state request 525, 750 may be provided from the LSM 520 directly to the output means 340 of the controller 305.

Referring to FIG. 8, after time $t_3$, i.e. once the speed of the vehicle 100 is equal to or below the first LST 910, it has been determined that it is desirable to couple the second electric traction motor 212. For example, it can be envisaged that the vehicle 100 is about to stop and that torque from the second electric traction motor 212 will be useful e.g. for a standing start. A predetermined vehicle speed corresponding to the first LST 910 may be a vehicle speed of 10 kmh$^{-1}$ although it will be appreciated that other vehicle speeds may be selected. In some embodiments, the vehicle speed corresponding to the first LST 910 may be selected or determined based on a deacceleration rate of the vehicle 100, which may be determined based on a rate of change of the speed signal 410. In the presence of a large deceleration i.e. above a deacceleration threshold the vehicle speed corresponding to the first LST 910 may be increased to advantageously allow for coupling of the second electric traction motor 212 prior to the vehicle 100 stopping.

The output means 340 of the controller 305 is arranged to output the coupling signal 345, 750 indicative of a request to couple 750 the second electric traction motor 212 to the at least one wheel of the second axle 222 in dependence on the desired coupling state being coupled, as in step 1030.

In some instances, due to a default state being coupled as shown in Table 1 below, the request to couple 750 shown in FIG. 8 output as a result of the speed of the vehicle dropping through the LST 910 will have no practical effect (change in state) as the second electric traction motor 212 will already be coupled to the second axle 222 as a result of the default state being coupled. However, in some instances, the second electric traction motor 212 will be decoupled from the second axle 222 when the speed of the vehicle drops through the LST 910. In such situations, the arbitrator 570 may determine an arbitrated coupling state with respect to the LTS 910 in dependence on a reason why the second electric traction motor 212 is disconnected. If the arbitrated coupling state is decoupled whilst the vehicle speed is above the LST 910 for a high priority reason, such as a fault, then the arbitrator 570 will not change the arbitrated coupling state to coupled responsive to the request to couple 750 from the LSM 520. However, if the reason for the decoupled state is lower priority, such as a preferential reason, the arbitrator 570 may change the arbitrated coupling state to coupled responsive to the request to couple 750 from the LSM 520.

If, in step 1020, if the speed of the vehicle 100 is greater than the first LST 910, the method moves to step 1040. In step 1040 it is determined whether the speed of the vehicle 100 is greater than or equal to the second LST 920. If the speed of the vehicle is greater than or equal to the second LST 920 the method moves to step 1060.

In step 1060 the LSM 520 is arranged not to request a desired coupling state of the second electric machine 212. The LSM 520 outputs a request for a coupling state to the arbitrator 570 and may, as illustrated in FIG. 8, output a 'no-request' signal 730 to the arbitrator 570, where the no-request signal 730 is indicative of the LSM 520 not requesting a specific coupling state of the second electric traction motor 212 to the one or more wheels of the second axle 222. Thus, prior to time $t_3$ in FIG. 8, the LSM 520 outputs the no-request signal 730 to the arbitrator 570, or may output no signal to the arbitrator 570 in other embodiments. The arbitrator 570 may have a default coupling state. The default coupling state may be coupled i.e. for the second electric traction motor 212 to be coupled to the torque path of the second axle 222. Thus when either a 'no-request' signal 730, or no request signal is received by the arbitrator 570, the arbitrator 570 may output a determined coupling request via the output means 340.

In some embodiments, the LSM 520 is arranged to output the coupling signal 345, indicative of a request to couple the second electric traction motor 212 to the at least one wheel of the second axle 222. It will be appreciated that the LSM 520 may, in some embodiments, request the default state of coupled when the speed signal 410 is indicative of a low vehicle speed i.e. below the first LST 910.

In some embodiments, the LSM 520 may apply hysteresis to the speed signal 410 to determine the coupling state. That is, the coupling state of coupled may be determined for a vehicle speed greater than that at which the second electric traction motor 212 is determined to be coupled to the torque path via the second axle 222 i.e. above the first LST 910. Advantageously this assists in preventing 'hunting' or 'flickering' between decoupled and coupled states as the speed of the vehicle varies around (above and below) the first LST 910. Use of the second LST 920 provides the hysteresis in some embodiments. As can be appreciated from FIG. 8, between $t_3$ and prior to time $t_4$ the vehicle accelerates from a minimum speed, such that the speed signal 410 exceed the first LST 910 for a period of time prior to time $t_4$. As can be appreciated from the lower portion of FIG. 8, the 'no-request' signal 730 is not output immediately upon the speed of the vehicle 100 exceeding the first LST 910 i.e. coupled 750 is maintained.

Instead, in a region between the first and second LSTs 910, 920 the coupling state of coupled 750 is maintained until the vehicle speed falls exceeds the second LST 920 at time $t_4$. In step 1050, which is reached when the vehicle speed is between the first and second LSTs 910, 920 the desired coupling state is determined in dependence on the speed signal 410 in dependence on a last intersected of the first and second LSTs 910, 920. Thus, prior to time $t_4$ when the speed signal 410 is below the second LST 920 the coupling state is determined in step 1050 as coupled based on last-intersecting the first LST 910. Similarly, immediately prior to time $t_3$, when the speed signal 410 is above the first LST 920, the 'no request' output signal 730 is maintained as the last intersected threshold is the second LST 920.

As can be appreciated from FIG. 8, some embodiments of the LSM 520 comprise a third LST 930. The coupling of the motor 212 is inhibited if not successfully coupled to the second torque path via the second axle 222 when the vehicle speed 410 is equal to or less than the third LST 930. The third LST 930 may correspond to a speed of, for example, 5 kmh$^{-1}$ although it will be appreciated that other speeds may be selected.

In some embodiments, the LSM 520 is arranged to receive a signal indicative of a coupling status 470 of the second electric traction motor 212 to the at least one wheel of the axle 222. The signal 470 reports whether the second electric traction motor 212 is successfully coupled to the at least one wheel of the axle 222. In some situations, the coupling state may be determined as coupled and a corresponding request output by the controller 305. However for electrical and/or mechanical reasons it may not be possible, at least immediately, to couple the motor 212 to the second torque path. For example, the second clutch 219 may not have yet successfully engaged a drive output of the motor 212 to the axle 222. In particular, it may be difficult to successfully couple the motor 212 when the vehicle is moving slowly or has become stationary. Furthermore, attempted coupling of the motor 212 to the axle may be increasingly noticeable, such as in the form of noise and/or vibration, to occupants of the vehicle 100 at slow speeds and may possibly cause damage if attempted whilst stationary. Use of the third LST 930 reduces such risks.

The LSM 520 in some embodiments determines a coupling inhibited state. The LSM 520 in some embodiments outputs a coupling inhibit signal 526 in the coupling inhibited state when the speed signal 410 is indicative of a vehicle speed equal to or below the third LST 930. The LSM 520 may output the coupling inhibit signal 526 when the vehicle speed is below the third LST 930 and the coupling status signal 470 is indicative of the second electric traction motor 212 being decoupled from the second axle 222 i.e. successful coupling caused by the vehicle speed being below the first LST 910 has not yet occurred.

In some embodiments, the LSM 520 may apply hysteresis to the speed signal 410 to determine the coupling inhibited state. That is, the coupling inhibited state may be determined for a vehicle speed greater than the third LST 930. Advantageously this assists in preventing 'hunting' or 'flickering' between the decoupled and coupled states as the speed of the vehicle varies around (above and below) the third LST 930. Use of a fourth LST 950, as shown in FIG. 9 provides the hysteresis in some embodiments. The fourth LST 950 defines a maximum speed of a coupling inhibition region 940 defining the coupling inhibited state. The third and fourth LSTs 930, 950 act as described above with respect to the first and second LSTs 910, 92 and the speed signal 410.

Some embodiments of the invention comprise a fault management module (FMM) 530. The FMM 530 is arranged to determine a desired coupling state of the second electric traction motor 212 to the at least one wheel (RL, RR) of the second axle 222 in dependence on detection or determination of one or more faults associated with the vehicle 100. The coupling state determined by the FMM 530 is selected to manage or mitigate faults associated with the vehicle 100. For example, the FMM 530 may receive the temperature signal 420, wherein the temperature signal 420 is indicative of an invertor temperature associated with the second electric traction motor 212. In the event of the temperature signal 420 indicating that the invertor has a high temperature (above a predetermined threshold), the FMM 530 is arranged to determine the coupling state as decoupled in order to allow the second electric traction motor 212 to be inactive thereby allowing the invertor to cool for a period of time. In another example, the FMM 530 is arranged to receive the coupling status signal 470 discussed above. The coupling status signal 470 may be indicative of a failure to decouple the second electric traction motor 212 to the axle. Therefore the FMM 530 may determine the coupling state as coupled in dependence thereon to reduce problems associated with the problematic decoupled state. The FMM 530 is arranged to output a fault-derived coupling state request (FDCSR) signal 535 in dependence on one more received signals indicative of fault state associated with the vehicle 100. The FDCSR signal 535 is indicative of a coupling state request determined by the FMM 530 in response to one or more faults or undesirable conditions or parameters associated with the vehicle. The FDCSR signal 535 is received by the arbitrator 570 in some embodiments as shown in FIG. 4.

In some embodiments, the FMM 530 is arranged to manage retries, i.e. further attempts, of changes in the coupling state of the second electric traction motor 212 in the presence of a failure to successfully change the coupling state. In particular, in some embodiments, the FMM 530 is arranged to control the output means 340 of the controller 305 to output a signal 345 indicative of a retry, i.e. to request a further attempt, of a change in the coupling state of the second electric traction motor 212 as will be explained.

FIG. 11 illustrates a method 1200 according to an embodiment of the invention. The method 1200 is a method of managing retries of a change in coupling state of the second electric traction motor 212.

In step 1210 the coupling state of the second electric traction motor 212 is determined. The coupling state may be determined by one of the modules 510-560 and a consequent coupling state request signal received at the arbitrator 570, or by the arbitrator 570 such as in the case of the default coupling state in the absence of any requests from the modules 510-560.

In step 1220, a coupling state request signal 345 is output from the controller 305 via the output means 340 to request the determined coupling state. For example, the coupling state request may be a request for one of a coupled or decoupled state of the second electric traction motor 212 to the second axle 222.

In step 1230 the FMM 530 is arranged to determine whether a failure to change the coupling state of the second electric traction motor 212 to the second axle 222 has occurred. As discussed above, the coupling status signal 470 is indicative of the actual coupling status of the second electric traction motor 212 to the one or both wheels of the second axle 222. Therefore, the FMM 530 is able to determine, in dependence on the coupling status signal 470, whether the failure has occurred i.e. whether the actual coupling state reflects the requested coupling state. Step 1230 may be performed after a delay to allow a change in coupling state to be implemented, such as the second clutch 219 being opened or closed. If the change in coupling state is successful the method returns to step 1210. If, however, the change was not successful i.e. a failure to change the coupling state of the second electric traction motor 212 has occurred as indicated by the coupling status signal 470, the method moves to step 1240.

In step 1240 a speed of the vehicle 100 is determined. Step 1240 comprises receiving the speed signal 410 indicative of the speed of the vehicle 100. Controlling the output means 340 of the controller 305 to output the coupling signal 345 indicative of a retry of the change in the coupling state is performed in dependence on the speed signal 410 as will be explained.

In some embodiments, the FMM 530 is arranged to defer controlling the output means 340 to output the coupling signal 345 indicative of the retry of the change in the coupling state in dependence on the speed signal 410 being indicative of the speed of the vehicle 100 being at least a predetermined minimum speed. The predetermined minimum speed may be, for example, a speed greater than substantially 0 kmh$^{-1}$. Other predetermined minimum speeds may be, for example, 5 kmh$^{-1}$ although it will be appreciated that other minimum speeds may be selected. Advantageously, preventing a retry of the change in coupling state, particularly from changes from decoupled to coupled, at to too low a vehicle speed may prevent the retry of the engagement of the second electric traction motor 212 with the axle being noticeable to occupants of the vehicle 100. For example, such as (although not exclusively) where the second clutch 219 is a dog clutch, attempting the retry may cause noise and/or vibration at low vehicle speeds.

In some embodiments, the FMM 530 is arranged to defer controlling the output means 345 to output the coupling signal 345 indicative of the retry of the change in the coupling state in dependence on the speed signal being indicative of the speed of the vehicle 100 being less than a maximum speed. The maximum speed may be, for example up to 50 kmh$^{-1}$ or up to 30 kmh$^{-1}$ or up to 20 kmh$^{-1}$ although other maximum speeds may be chosen. As noted above, in order to couple the second electric traction motor 212 to the second axle 222 it may be necessary to 'spin-up' or accelerate the motor 212 to approximately the rotation speed of the axle 222. Advantageously the maximum speed prevents or reduces energy used in coupling the motor 212 to the axle 222. Furthermore, changing from the decoupled to the coupled state at vehicle speed below the maximum speed may avoid attempting to couple the second electric traction motor 212 to the axle during periods of large deacceleration i.e. during heavy braking or other slowing of the vehicle 100 when it may be difficult to match the rotation speed of the second electric traction motor 212 to the axle 222. Thus the FMM 530 defers controlling the output means 340 to output the coupling signal 345 indicative of the retry of the change in the coupling state in dependence on the speed signal 410 being indicative of the speed of the vehicle being less than or equal to the predetermined maximum speed.

In step 1250 the FMM 530, when it is determined that the speed of the vehicle 100 is either above the minimum speed or above the minimum speed and below the maximum speed considered in step 1240, the FMM 530 is arranged to output a signal 535 indicative of a request to retry the change of coupling state.

The signal 535 may be a further request for the change in coupling state such as a request for one or the coupled or decoupled state. The request may be received by the arbitrator 570 which outputs a corresponding request or signal 345 via the output means 340 to cause the retry of the change in coupling state. Once the retry of the change has been requested the method returns to step 1230, where it is considered whether the retry has been successful.

In some embodiments, for every iteration of step 1250 a counter is maintained to track a number of retries of the change in coupling state. The FMM 350 in some embodiments is arranged to attempt the retry up to a predetermined maximum number of times. That is, to perform step 1250 up to the maximum number of times. The maximum number of times may be 5, 3 or 2 in some embodiments. Advantageously the maximum number of retries may prevent excessive numbers of retries to avoid damaging the system 300, and/or reduces energy wasted 'spinning-up' the second electric traction motor 212 to attempt further retries.

Some embodiments of the invention comprise an anti-fussiness module (AFM) 540. The AFM 540 is arranged to control changes in coupling state of the second electric traction motor 212. In particular, the AFM 540 is arranged to control a timing of changes in the coupling state of the second electric traction motor 212. The AFM 540 may ensure that changes in the coupling state of the second electric traction motor 212 do not occur too frequently i.e. that at least a predetermined period of time is provided between changes in coupling state of the second electric traction motor 212. The AFM 540 is illustrated in FIG. 4 as forming part of the arbitrator 570. It will, however, be realised that the AFM 540 may be located elsewhere i.e. that other structures may be envisaged.

Figure 12:
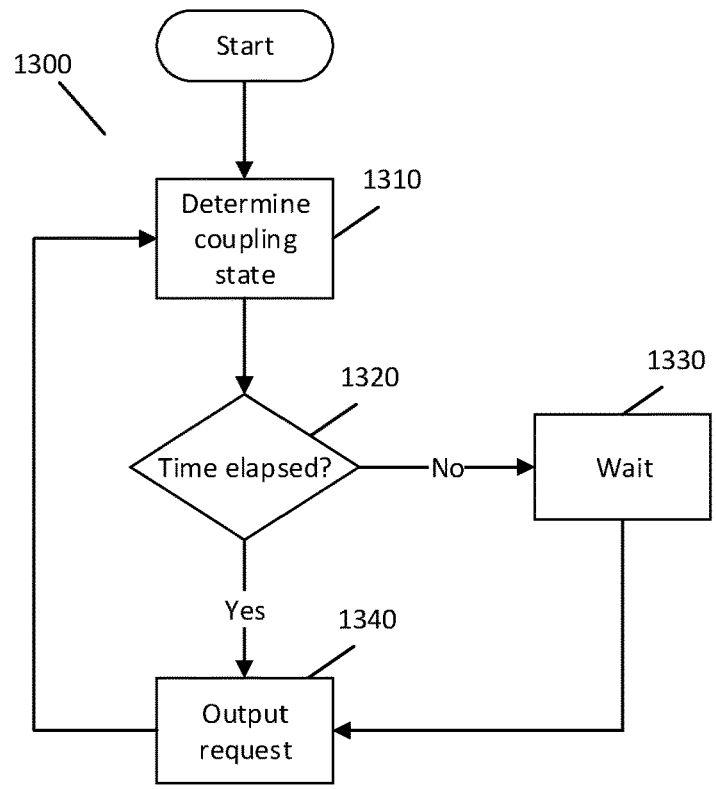
FIG. 12 shows a method according to further embodiment of the invention.

FIG. 12 illustrates a method 1300 according to an embodiment of the invention. The method 1300 is a method of controlling changes in coupling state of the second electric traction motor 212 according to an embodiment of the invention. The method 1300 may be performed by the AF module 540.

In step 1310 of the method a coupling state of the second electric traction motor 212 to the second torque path via the second axle 222 is determined. In other words, step 1310 comprises determining whether the second electric traction motor 212 is coupled to one or more wheels (RR, RL) of the second axle 222 of the vehicle 100. The determination is performed in dependence on at least one attribute signal, such as the speed signal 410 indicative of the speed of the vehicle 100, or the driving mode signal 440. As described above, the coupling state of the second electric traction motor 212 may be determined by one of modules 510, 520, 530, 550, 560 and a corresponding signal or request provided to the arbitrator 570. For example, the HSM 510 may provide a request to decouple the second electric traction motor 212 from the rear axle 222, whilst the FMM 530 may provide a request to couple the second electric traction motor 212 to the rear axle 222. Thus requests for various coupling states may originate from different modules.

Advantageously the AF module 540 is arranged to prevent frequent changes in coupling state of the second electric traction motor 212 in order to avoid such changes being noticeable to occupants of the vehicle 100. Step 1310 may comprise one or more requests for a coupling state being received at the arbitrator 570 and, in particular, the AFM 540.

Step 1320 comprises determining whether a predetermined period of time has elapsed since a last, or most recent previous, change in coupling state of the second electric traction motor 212. The predetermined period of time may be a period of time since a last request for a change in coupling state was output by the controller 305, or since a successful change in coupling state reported by the coupling status signal 470. The predetermined period of time may be, for example, at least 5 second, at least 10 seconds, at least 20 seconds or at least 30 seconds. It will be appreciated that other periods of time may be envisaged. If the predetermined period of time has elapsed the method 1300 moves to step 1340.

If the predetermined period of time has not elapsed, the method moves to step 1330 where the AFM 540 is arranged to wait i.e. to defer controlling the output means 340 of the controller 305 to output the coupling signal 345 indicative of the requested change in the coupling state until expiry of the predetermined period of time since the last change in the coupling state. The AFM 540 may buffer incoming or received coupling state requests from the modules 510, 520, 530, 550, 560 until expiry of the predetermined period of time, as it will be appreciated that the desired coupling state may be continuously re-evaluated during the predetermined period of time. Thus upon expiry of the predetermined period of time the coupling state may be determined based upon most recently-received coupling state requests rather than implementing a first-buffered request. Advantageously this ensures that the requested coupling state upon expiry of the predetermined period of time reflects most recent attributes of the vehicle 100. Upon expiry of the predetermined period of time the method moves to step 1340.

In step 1340 the AF module 540 is arranged to control the output means 340 of the controller 305 to output the coupling request signal 345 to control coupling of the second electric traction motor 212 to the rear axle 222. In some embodiments, the inhibit module is provided with a signal 575 indicative of an arbitrated coupling request, as will be explained.

Some embodiments of the invention comprise an inhibit module 550. The inhibit module 550 is arranged to control changes in coupling state of the second electric traction motor 212. In particular, the inhibit module 550 is arranged to allow for inhibition of one or more coupling states of the second electric traction motor 212 to the rear axle 222. The inhibition of a coupling state prevents the inhibited coupling state being requested by the controller 305. The inhibit module 550 is illustrated in FIG. 4 as forming part of the arbitrator 570. It will, however, be realised that the inhibit module 550 may be located elsewhere i.e. that other structures may be envisaged.

The inhibit module 550 is arranged to receive the inhibit signal 460. The inhibit signal is indicative of one or more coupling states of the second electric traction motor 212 to the rear axle 222 which are prohibited or inhibited. The inhibit signal 460 may be indicative or one of the coupled and decoupled states of the second electric traction motor 212 to the rear axle 222. Whilst the inhibit signal 460 is shown as one signal it will be appreciated that in other embodiments a respective signal may be provided for each of the coupled and decoupled coupling states to indicate whether each state is inhibited. The inhibit module is arranged to output a coupling state inhibit signal 555 to the arbitrator which is indicative of a request for a coupling state as described below. In particular, the coupling state inhibit signal 555 is indicative of a request for a coupling state when that coupling state is not inhibited, thereby further indicating which coupling states are not inhibited.

Figure 13:
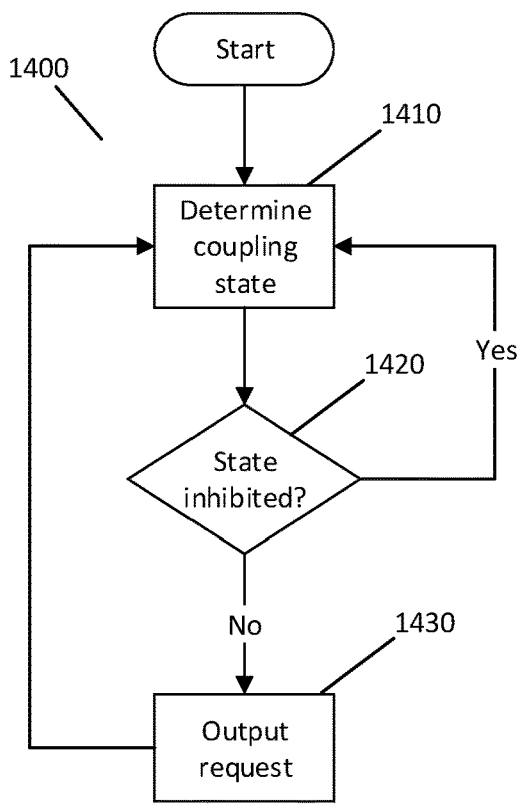
FIG. 13 shows a method according to a yet further embodiment of the invention.

FIG. 13 illustrates a method 1400 according to an embodiment of the invention. The method 1400 is a method of controlling changes in coupling state of the second electric traction motor 212 according to an embodiment of the invention. The method 1400 may be performed by the inhibit module 550.

In step 1410 of the method a coupling state of the second electric traction motor 212 to the second torque path via the second axle 222 is determined. In other words, step 1410 comprises determining whether the second electric traction motor 212 is coupled to one or more wheels (RR, RL) of the second axle 222 of the vehicle 100. The determination may be performed in dependence on a determination of an expected amount of power required to spin-up the second electric traction motor 212 to the speed of the rear axle as compared to an amount of power available from the traction battery 200. As described above, the coupling state of the second electric traction motor 212 may be determined by one of modules 510, 520, 530, 560 and a corresponding signal or request provided to the arbitrator 570. For example, the HSM 510 may provide a request to decouple the second electric traction motor 212 from the rear axle 222, whilst the FMM 530 may provide a request to couple the second electric traction motor 212 to the rear axle 222. Thus requests for various coupling states may originate from different modules. Advantageously the inhibit module 550 is arranged to prevent a coupling state of the second electric traction motor 212 being selected, such as in order to avoid a state associated with a fault. For example, when it is determined that a fault exists which prevents the second electric traction motor 212 from coupling to the rear axle 222, the inhibit module 550 may inhibit the coupled state to avoid the coupled state being selected. Similarly, in some embodiments, one or more coupling states may be inhibited dependent upon one or more of a power limit or capability of the traction battery 200. For example, if it is determined that the capability of the traction battery 200 to provide sufficient power to spin up the second electric traction motor 212 for coupling to the rear axle 222, the coupled state may be inhibited in step 1410.

Step 1410 may comprise one or more requests for a coupling state being received at the arbitrator 570 and, in particular, the inhibit module 550. As explained below, the arbitrator 570 may determine an arbitrated coupling state in dependence on the received requests.

In step 1420 it is determined whether the determined coupling state is inhibited. The determined coupling state may be the arbitrated coupling state determined by the arbitrator 570. Step 1420 comprises comparing the determined coupling state against the one or more inhibited coupling states, such as where the coupled state is indicated as inhibited by the inhibit signal 460. Where the determined coupling state and the coupling state indicated by the inhibit signal differ, or no coupling state is indicated as inhibited, the method moves to step 1430. If, however, the determined coupling state is indicated as inhibited by the inhibit signal 460 the method returns to step 1410. In other words, the method 1400 prevents a request for an inhibited coupling state being output in step 1430.

In step 1430 the inhibit module 550 is arranged to control the output means 340 of the controller 305 to output the coupling request signal 345 to control coupling of the second electric traction motor 212 to the rear axle 222. That is, when the determined coupling state is not indicated as inhibited by the inhibit signal 460 a request for the determined coupling state is output by the controller 305.

Some embodiments of the invention comprise a driving mode module (DMM) 560. The DMM 560 is arranged to determine a coupling state of the second electric traction motor 212 in dependence on a driving mode of the vehicle 100. The driving mode of the vehicle 100 is indicated by the driving mode signal 440. The driving mode of the vehicle 100 may be selected by a driver or occupant of the vehicle 100, or may at least in part be determined by a module or system of the vehicle 100, such as a terrain-response (TR) module which adaptively selects a driving mode including one or more settings of the vehicle and, in particular, a powertrain thereof such as a traction control mode thereof, for example. The driving mode may include driving selected settings, such as of the powertrain, including a driving mode of the vehicle including one of forward, reverse or neutral in the case of an automatic gearbox or a gear selection of a manual gearbox. The driving mode may include a selection of one of sport, normal or economy driving modes where settings of one or more of the engine, first and/or second electric motors, suspension etc of the vehicle 100 may be adapted accordingly. Data indicative of the selected driving mode(s) is provided by the driving mode signal.

Figure 14:
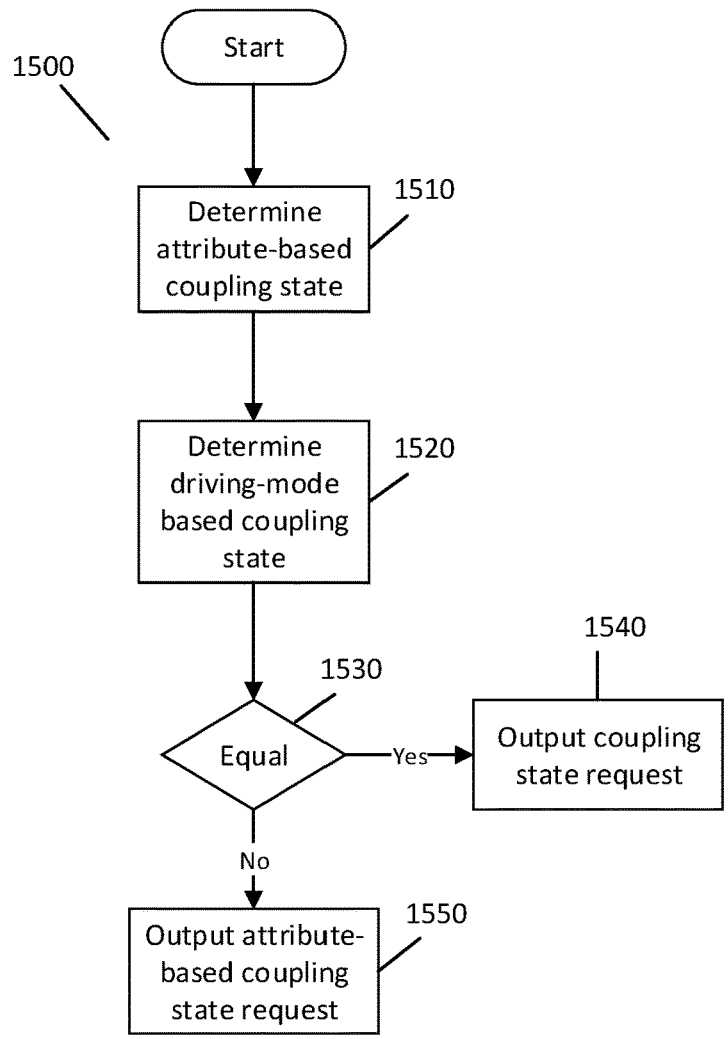
FIG. 14 shows a method according to still further embodiment of the invention.

FIG. 14 illustrates a method 1500 according to an embodiment of the invention. The method 1300 is a method is a method of controlling changes in coupling state of the second electric traction motor 212 according to an embodiment of the invention. Some of the steps of the method 1500 may be performed by the DMM 560.

In step 1510 an attribute-based coupling state of the second electric traction motor 212 to the second axle 222 is determined. The determination in step 1510 is performed in dependence on at least one attribute signal, such as the speed signal 410 indicative of the speed of the vehicle. As described above, the coupling state of the second electric traction motor 212 may be determined by one of modules 510, 520, 530, 560 and a corresponding signal or request provided to the arbitrator 570. For example, the HSM 510 may provide a request to decouple the second electric traction motor 212 from the rear axle 222, whilst the FMM 530 may provide a request to couple the second electric traction motor 212 to the rear axle 222. Thus requests for various coupling states may originate from different modules. Step 1510 may be performed by one of more the HSM 510, the LSM 520, and FMM 530. Step 1510 may be performed in dependence on signals 515, 525, 535 except for the driving mode signal 440. One of more signals indicative of the determined coupling states is provided to the arbitrator 570. The one or more coupling states determined in step 1510 may be together referred to as first coupling states of the second electric traction motor 212.

In step 1520 a driving-mode-based coupling state of the second electric traction motor 212 to the second axle 222 is determined. Step 1520 is determined in dependence on the driving mode signal 440.

In one example, the driving mode signal 440 may indicate a selected driving mode of the vehicle including selection of an efficiency-based driving mode. The efficiency-based driving mode is selected in order to provide improved efficiency of the vehicle 100, i.e. reduced energy consumption, such as the expense of performance of the vehicle 100. The efficiency may be to improve consumption of fuel provided to the engine 202 or to conserve electrical power consumed the motors 212, 216. The driving mode signal 440 is indicative of the selection of the efficiency based driving mode which may be manually or automatically selected. Similarly, in another example, the driving mode signal may be indicative of a neutral gear of the vehicle 100 being selected.

In dependence on the driving mode signal 440 the DMM 560 is arranged to determine the coupling state of the second electric traction motor 212 to the rear axle 222, such as one of coupled and decoupled. A signal 565 indicative of the driving-mode-based coupling state is provided to the arbitrator 570. The driving-mode-based coupling state may be referred to as a second coupling state of the second electric traction motor 212. Thus the coupling state determined in step 1520 may be decoupled.

In another example, the driving mode signal 440 may indicate either a driver-selected or automatically-selected, such as by the terrain response module, driving mode such as requesting four-wheel drive of the vehicle 100 which requires coupling of the second electric traction motor 212 to provide power to the rear axle 222. Thus the coupling state may be determined as coupled in step 1520.

In step 1530 it is determined whether the first and second coupling states are the same i.e. equal. That is, whether the first coupling state as one of coupled or decoupled is equal to the second coupling state as one of coupled or decoupled. If the first and second coupling states are equal then, method moves to step 1540. If, however, the first and second coupling states differ then the method moves to step 1550.

In step 1540, the output means 340 is controlled to output the coupling signal 345 indicative of the first and second coupling states i.e. one of coupled or decoupled.

In step 1550, the output means 340 is controlled to output the coupling signal 345 indicative of the first coupling state i.e. the attribute-based coupling state when the determined first and second coupling states differ. That is, the arbitrator 570 is arranged to allocate a higher priority to the first coupling state than the second coupling state. This is reflected in Table 1 below, as will be explained, by the efficiency column being right-most such that coupling states determined e.g. by the HSM 510 etc take precedence. Only when no requests are received from the other modules does arbitrated coupling state independently follow the coupling state determined by the DMM 560.

Figure 15:
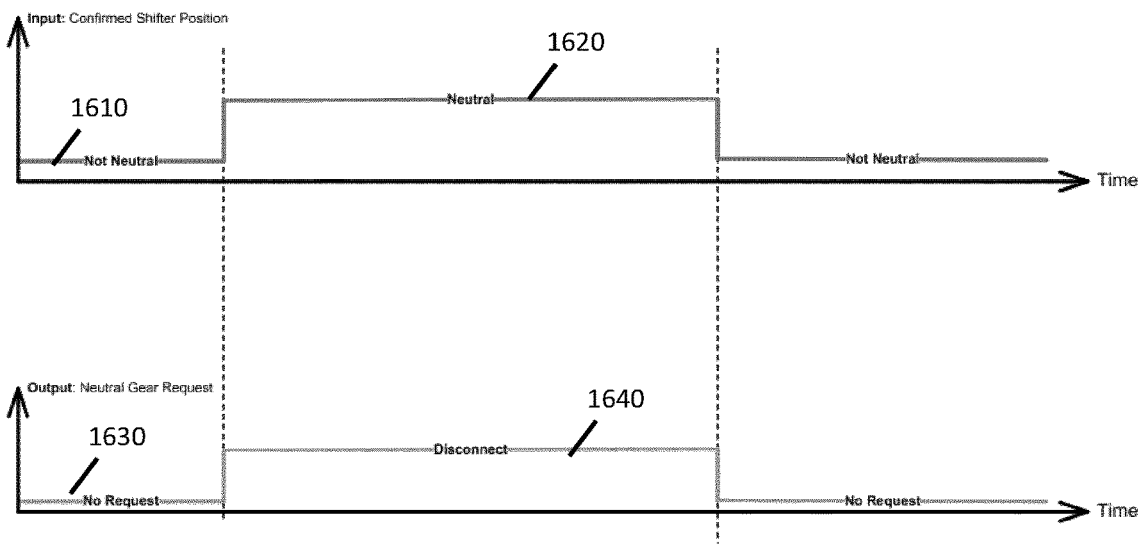
FIG. 15 illustrates operation of a module according to an embodiment of the invention.

FIG. 15 illustrates a coupling state determined by the DMM 560 according to some embodiments of the invention. In some embodiments, the DMM 560 is arranged to determine the coupling state of the second electric traction motor 212 in dependence on the driving mode signal 440 being indicative of a mode, or gear selection, of the powertrain in particular a gearbox thereof, such as one of drive (D), neutral (N) and Reverse (R) i.e. a shifter position. As can be appreciated, the DMM 560 is arranged to not to request 1630 a coupling state 1630 when the powertrain is not in neutral i.e. one of D or R is selected, or a gear of the gearbox is selected. In such a state the DMM 560 may output the no-request NR signal. However, when N is selected 1620, as indicated by the driving mode signal 440, the DMM 560 is arranged to output the coupling signal 565 to request the decoupled state 1640. Thus the second electric traction motor 212 is requested to be decoupled when N is selected.

As described above, some embodiments of the present invention comprise the arbitrator 570. The arbitrator 570 is arranged to receive one or more requests for coupling states of the second electric traction motor 212 and to determine an overall or arbitrated coupling state of the second electric traction motor 212 to the second axle 222. The arbitrator 570 is arranged to control the output means 340 of the controller 305 to output the coupling signal 345 indicative thereof.

The arbitrator 570 is arranged to allocate a predetermined precedence or priority to at least some of the requests for coupling states from different modules. Table 1 below identifies requests for coupling state requests received from the various modules of the controller 305, a default coupling state i.e. in the absence of any other requests, and a determined coupling state of the arbitrator 570.

TABLE 1

| FMM 530 | HSM 510 | LSM 520 | Neutral 560 | AWD 560 | AF 540 | Efficiency 560 | Default | Arbitrated 570 |
|---|---|---|---|---|---|---|---|---|
| D | X | X | X | X | X | X | X | D |
| NR | D | X | X | X | X | X | X | D |
| C | D | X | X | X | X | X | X | D |
| C | NR | X | X | X | X | X | X | C |
| NR | NR | C | X | X | X | X | X | C |
| NR | NR | NR | D | X | X | X | X | D |
| NR | NR | NR | NR | C | X | X | X | C |
| NR | NR | NR | NR | NR | NR | C | X | C |
| NR | NR | NR | NR | NR | NR | D | X | D |
| NR | NR | NR | NR | NR | NR | NR | C | C |

C = Coupled, D = Decoupled, NR = No Request, X = Don't Care.

The arbitrator 570 is arranged to receive the FDCSR signal 535 from the FMM 530 at an input means thereof. It can be appreciated that the arbitrator 570 also receives a plurality of further coupling state request signals 515, 525, 565, i.e. from each of modules 510, 520, 560. Each coupling state request signal is indicative of a request for a coupling state of the second electric traction motor 212 to the at least one wheel of the second axle 222.

Referring to FIG. 10, which illustrates a method of determining the coupling state in the presence of an FDCSR 535 from the FMM 530. The arbitrator 570 is arranged to determine an arbitrated coupling state of the second electric traction motor 212 to the at least one wheel of the second axle 222 in dependence on the FDCSR signal 535 and the at least one further coupling state request signal 515, 525, 565. The arbitrator 570 is arranged to determine the arbitrated coupling state of the second electric traction motor 212 in precedence on the FDCSR signal 535 over the at least one further coupling state request signal 515, 525, 565.

In FIG. 10, in step 1110 the arbitrator 570 is arranged to receive the FDCSR signal 535 from the FMM 530. The FDCSR signal 535 is indicative of a coupling state request as explained above. For example, the FDCSR signal 535 is indicative of a request for one of a coupled or decoupled state as indicated in Table 1.

In step 1120 the arbitrator 570 is arranged to receive any other coupling state request signals i.e. from modules 510, 520, 525, 525, 565, 560. It will be appreciated, as contemplated by Table 1, that at some points in time no other coupling state request are received at the same time as the FDCSR 535.

In step 1130, a coupling state of the second electric traction motor 212 is determined in dependence on the FDCSR 535 and any other received coupling state requests. As can be appreciated from Table 1 above, when the FDCSR signal 535 is indicative of the decoupled state (D), the arbitrator 570 is arranged to determine the arbitrated coupling state as decoupled irrespective of a state of the further coupling state request signals 515, 525, 565. Thus the arbitrator 570 is arranged to determine the coupling state of the electric machine 212 in precedence on the FDCSR signal 535 over the any further coupling state request signals. In particular, the arbitrator 570 is arranged to determine the decoupled state of the second electric traction motor 212 in precedence on the FDCSR signal 535 being indicative of a request to decouple the second electric traction motor 212 over any further coupling state requests.

When the arbitrator 570 receives the high-speed coupling state request 515, HSCSR, signal from the HSM 510 which is indicative of a request to disconnect (D) the second electric traction motor 212 from the second axle 222, as can be appreciated from Table 1, when no FDCSR 535 is received (NR) or when the FDCSR signal 535 is indicative of a coupled (C) request, the arbitrator 570 determines the arbitrated coupling state of the second electric traction motor 212 as decoupled in dependence on the request from the HSM 510 to, advantageously, protect the second electric traction motor 212 from excessive rotation speed. Thus, the decoupled request from the HSM 510 takes precedence over the FDCSR 535 when in contradiction.

In step 1140, the arbitrator 570 is arranged to output an arbitrated coupling request signal 575 indicative of the arbitrated coupling state to control coupling of the second electric traction motor 212 to the at least one wheel (RL, RR) of the second axle 222. The arbitrated coupling request signal 575 is output via the output means 340 of the controller 305 to control the coupling of the second electric traction motor 212.

Figure 16:
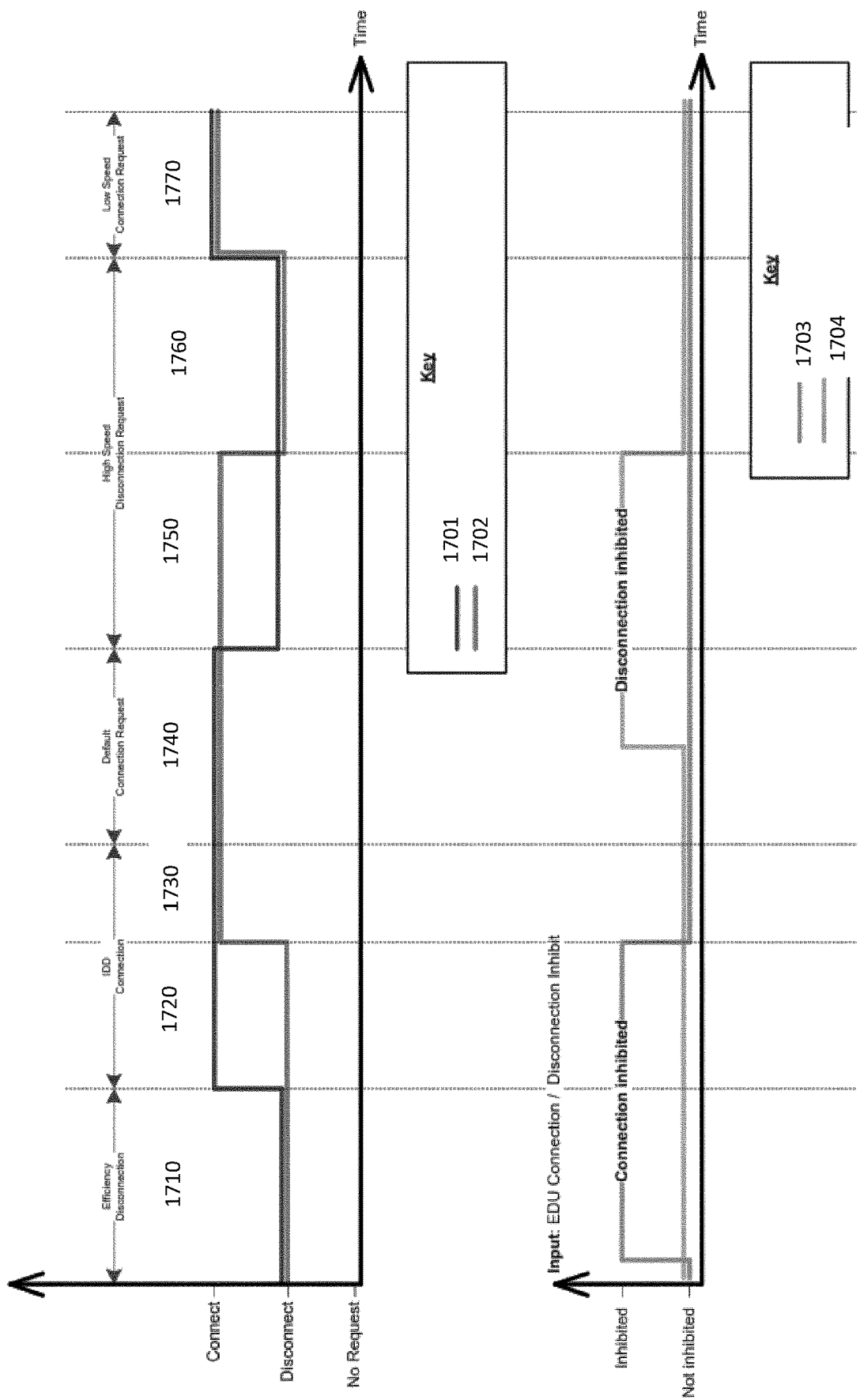
FIG. 16 illustrates operation of the system according to an embodiment of the invention.

FIG. 16 illustrates an overall operation of the system 300. Trace 1701 represents an arbitrated coupling state request output by the controller 305 as signal 345. Trace 1702 represents an actual coupling state of the second electric traction motor 212 to the at least one wheel (RL, RR) of the second axle 222. Trace 1703 is a connection inhibit signal and trace 1704 is disconnection or decoupled state inhibit signal.

As can be appreciated, during period 1710 the DMM 560 determines the coupling state is decoupled such as based on the driving mode signal 440 being indicative of the efficiency-based driving mode. The coupling state of coupled being inhibited, as indicated by 1703, does not have an effect since the arbitrated coupling state is decoupled. During period 1720 the DMM 560 determines the coupling state as coupled based on the IDD driving mode indicated by the driving mode signal 440. However, the connection inhibit signal 1703 indicates that the coupled state is inhibited, thereby the actual state of the coupling is decoupled i.e. the coupling inhibited state takes precedence over the coupled state requested by the DMM 560. However, during period 1730 once the coupled state inhibit signal 1703 indicates that the coupled state is not inhibited, the coupled state is achieved. During period 1740 the coupled state is requested as a default coupling state of the arbitrator 570, although partially during period 1740 the decoupled state is inhibited as shown by trace 1704 although this does not affect the coupling state during period 1740 as coupled is still requested by the arbitrator 570. However, during period 1750 when the decoupled state requested by the HSM 510, due to decoupled still being inhibited, the coupled state is maintained. Once the inhibition is cancelled during period 1760 the coupling state of decoupled is requested by the arbitrator 570 corresponding to the requested state of the HSM 510. During period 1760 the LSM 520 requests the coupled state.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An electric machine control system for a vehicle, the electric machine control system comprising one or more controllers, wherein the vehicle comprises an electric machine arranged to be selectively coupleable to provide torque to at least one wheel of an axle of the vehicle, the control system comprising:
  an input to receive a speed signal indicative of a speed of the vehicle;
  one or more electronic processors arranged to determine a desired coupling state of the electric machine to the at least one wheel of the axle in dependence on the speed signal, wherein the one or more electronic processors are arranged to determine the desired coupling state as:
  a decoupled state in dependence on the speed signal being indicative of a vehicle speed equal to or greater than a first high speed threshold; and
  a no-request state in dependence on the speed signal being indicative of a vehicle speed being equal to or below a second high-speed threshold, wherein the no-request state is indicative of not requesting a specific coupling state of the electric machine to the at least one wheel of the axle, and wherein the second high-speed threshold represents a vehicle speed lower than the first high-speed threshold; and
  an output arranged to output a coupling signal indicative of the desired coupling state to control coupling of the electric machine to the at least one wheel of the axle.

2. The control system of claim 1, wherein the one or more electronic processors are arranged to determine the desired coupling state in dependence on the speed signal being indicative of a vehicle speed between the first and second high-speed thresholds in dependence on a last intersected of the first and second high-speed thresholds.

3. The control system of claim 1, wherein the input is arranged to receive a temperature signal and the one or more electronic processors are arranged to determine the desired coupling state in dependence on the temperature signal; wherein the one or more electronic processors are arranged to perform at least one of the following: determine one or both of the first and second high-speed thresholds in dependence on the temperature signal; reduce one or both of the first and second high-speed thresholds in dependence on the temperature signal being indicative of at least a first predetermined temperature; and reduce one or both of the first and second high-speed thresholds in dependence on the temperature signal being indicative of less than or equal to a second predetermined temperature.

4. The control system of claim 1, wherein the input is arranged to receive a charge signal indicative of a state of charge of one or more batteries for providing electrical power to the electric machine and the one or more electronic processors are arranged to determine the desired coupling state in dependence on the charge signal.

5. The control system of claim 1, wherein the input is arranged to receive a charge signal indicative of a state of charge of one or more batteries for providing electrical power to the electric machine and the one or more electronic processors are arranged to determine the desired coupling state in dependence on the charge signal and the one or more electronic processors are arranged to determine the second high-speed threshold in dependence on the charge signal.

6. The control system of claim 1, wherein the input is arranged to receive a charge signal indicative of a state of charge of one or more batteries for providing electrical power to the electric machine and the one or more electronic processors are arranged to determine the desired coupling state in dependence on the charge signal and the one or more electronic processors are arranged to determine the desired coupling state of the electric machine as decoupled in dependence on the charge signal being indicative of a state of charge of the one or more batteries being less than a predetermined threshold and the speed signal being indicative of vehicle speed below the second threshold.

7. The control system of claim 1, wherein the input is arranged to receive one or more further signals indicative of a state of one or more further vehicle subsystems or one or more further attributes of the vehicle and the one or more electronic processors are arranged to determine the desired coupling state of the electric machine at least in part on dependence on the one or more further signals.

8. The control system of claim 1, wherein the input is arranged to receive one or more further signals indicative of a state of one or more further vehicle subsystems or one or more further attributes of the vehicle and the one or more electronic processors are arranged to determine the desired coupling state of the electric machine at least in part on dependence on the one or more further signals and the one or more electronic processors are arranged to determine the desired coupling state of the electric machine in precedence on the speed signal over the one or more further signals.

9. The control system of claim 1, wherein the first high-speed threshold represents a vehicle speed which is less than a desired decoupling vehicle speed, such that when the vehicle is accelerating the electric machine is decoupled from the at least one wheel of the axle when the vehicle reaches the desired decoupling vehicle speed.

10. A vehicle comprising the control system of claim 1.

11. A method of controlling coupling of an electric machine to provide torque to at least one wheel of an axle of a vehicle, the method comprising:
  receiving a speed signal indicative of a speed of the vehicle;
  determining a desired coupling state of the electric machine to the at least one wheel of the axle in dependence on the speed signal, wherein the desired coupling state is determined as:
    a decoupled state in dependence on the speed signal being indicative of a vehicle speed equal to or greater than a first high speed threshold; and
    a no-request state in dependence on the speed signal being indicative of a vehicle speed being equal to or below a second high-speed threshold, wherein the no-request state is indicative of not requesting a specific coupling state of the electric machine to the at least one wheel of the axle, and wherein the second high-speed threshold represents a vehicle speed lower than the first high-speed threshold; and
  outputting a coupling signal indicative of the desired coupling state to control coupling of the electric machine to the at least one wheel of the axle.

12. A non-transitory, computer-readable storage medium storing instructions thereon that, when executed by one or more electronic processors, causes the one or more electronic processors to carry out the method of claim 11.

* * * * *